US011507994B2

(12) United States Patent
Bersia

(10) Patent No.: US 11,507,994 B2
(45) Date of Patent: *Nov. 22, 2022

(54) METHOD FOR RECOMMENDING VEHICLES

(71) Applicant: Geotab Inc., Oakville (CA)

(72) Inventor: Alessandro Bersia, Burlington (CA)

(73) Assignee: Geotab Inc., Oakville (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/108,789

(22) Filed: Dec. 1, 2020

(65) Prior Publication Data

US 2022/0114637 A1 Apr. 14, 2022

Related U.S. Application Data

(60) Provisional application No. 63/090,885, filed on Oct. 13, 2020.

(51) Int. Cl.
*G06Q 30/06* (2012.01)
*G06N 20/00* (2019.01)
*G06N 3/04* (2006.01)

(52) U.S. Cl.
CPC ........ *G06Q 30/0629* (2013.01); *G06N 3/04* (2013.01); *G06N 20/00* (2019.01); *G06Q 30/0631* (2013.01)

(58) Field of Classification Search
CPC .............................................. G06Q 30/06–08
See application file for complete search history.

(56) References Cited

U.S. PATENT DOCUMENTS

| | | | |
|---|---|---|---|
| 2002/0173881 A1* | 11/2002 | Lash | G08G 1/09675 701/1 |
| 2009/0006373 A1* | 1/2009 | Chakrabarti | G06F 16/335 |
| 2012/0072243 A1 | 3/2012 | Collins et al. | |
| 2020/0202410 A1* | 6/2020 | Edwards | G07C 5/008 |
| 2020/0320868 A1 | 10/2020 | Lewis et al. | |
| 2022/0114641 A1 | 4/2022 | Bersia | |
| 2022/0114642 A1 | 4/2022 | Bersia | |

FOREIGN PATENT DOCUMENTS

EP 3 438 912 A1 2/2019

OTHER PUBLICATIONS

Difference Between Make and Model of a Car (Year: 2012).*
Vehicle Size Class, Wikipedia (Year: NA) (Year: NA).*
Wikipedia, Discrete Global Grid (Year: NA) (Year: NA).*
What is Horsepower and Why is it important, Jul. 25, 2019 (Year: 2019).*
Bersia, Recommender system for recommending vehicles. Co-pending U.S. Appl. No. 17/108,743, filed Sep. 1, 2020.
Bersia, Intelligent telematics system for recommending vehicles. Co-pending U.S. Appl. No. 17/108,772, filed Sep. 1, 2020.

(Continued)

*Primary Examiner* — Ming Shui
(74) *Attorney, Agent, or Firm* — Wolf, Greenfield & Sacks, P.C.

(57) ABSTRACT

Systems and methods relating to recommending vehicles similar to a first vehicle based on telematic data and vehicle manufacturing data and using machine learning techniques, and systems and methods for ranking recommended vehicles according to evaluation criteria are disclosed.

27 Claims, 23 Drawing Sheets

| HWID | VIN | DateTime | Speed km/h | LAT | LONG | Ignition State | RPM | Engine Load % | Odometer km | x-axis g | y-axis g | z-axis g | SeatBelt |
|---|---|---|---|---|---|---|---|---|---|---|---|---|---|
| 1651537948 | 19ABA65576A061968 | 2019/08/01 14:32:50UTC | 100 | 48.8566969 | 2.3514616 | ON | 3598 | 70 | 14,876 | .5 | .5 | 0 | Yes |
| 1651537948 | 19ABA65576A061968 | 2019/08/01 14:33:63UTC | 98 | 48.8783773 | 2.2402250 | ON | 1205 | 21 | 70,645 | .5 | .03 | 0 | Yes |
| 1651537948 | 19ABA65576A061968 | 2019/08/01 14:34:00UTC | 97 | 40.7127281 | -74.0060152 | ON | 2376 | 64 | 34,070 | .8 | .08 | 0 | Yes |
| 1651537948 | 19ABA65576A061968 | 2019/08/01 14:40:66UTC | 70 | 40.7293810 | -74.0705590 | ON | 1845 | 37 | 29,463 | .6 | .05 | 0 | Yes |
| 1651537948 | 19ABA65576A061968 | 2019/08/01 14:42:22UTC | 40 | 36.1672559 | -115.1485163 | ON | 2645 | 73 | 66,801 | .5 | .15 | 0 | Yes |
| 1651537948 | 19ABA65576A061968 | 2019/08/01 14:45:68UTC | 20 | 43.6534817 | -79.3839347 | ON | 2254 | 44 | 103,027 | .3 | .25 | 0 | Yes |
| 1651537948 | 19ABA65576A061968 | 2019/08/01 14:59:11UTC | 0 | 45.4211060 | -75.6903080 | OFF | 0 | 0 | 32.572 | .3 | ..3 | 0 | Yes |
| 1651537948 | 19ABA65576A061968 | ... | ... | ... | ... | ... | ... | ... | ... | ... | ... | ... | ... |
| 1651537948 | 19ABA65576A061968 | 2020/02/02 14:60:00UTC | 0 | -24.7952076 | -65.3958674 | OFF | 0 | 0 | 54,381 | .5 | .5 | 0 | Yes |

(56) References Cited

OTHER PUBLICATIONS

U.S. Appl. No. 17/108,743, filed Sep. 1, 2020, Bersia.
U.S. Appl. No. 17/108,772, filed Sep. 1, 2020, Bersia.
Extended European Search Report for European Application No. 21198432.3, dated Feb. 21, 2022.
Extended European Search Report for European Application No. 21200040.0, dated Feb. 21, 2022.5.
Extended European Search Report for European Application No. 21201356.9, dated Feb. 21, 2022.5.
[No Author Listed] What is Horsepower and why is it important? Toyota. Jul. 25, 2019:1-10.

* cited by examiner

PRIOR ART

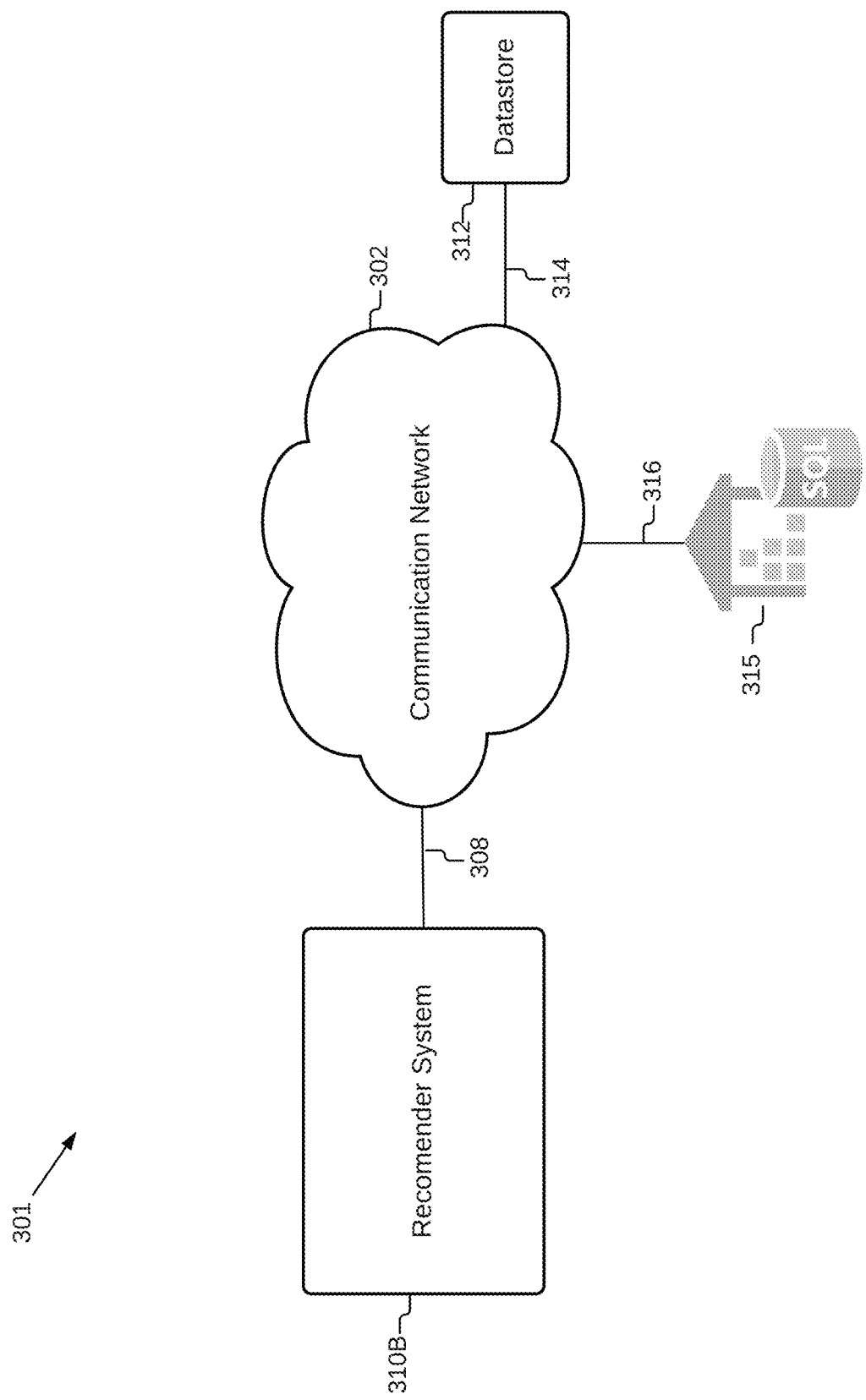

| 410 | HWID | VIN | DateTime | Speed km/h | LAT | LONG | Ignition State | RPM | Engine Load % | Odometer km | x-axis g | y-axis g | z-axis g | SeatBelt |
|---|---|---|---|---|---|---|---|---|---|---|---|---|---|---|
| | 430 | 431 | 432 | 433 | 434 | 435 | 436 | 437 | 438 | 439 | 440 | 441 | 442 | 443 |
| 410-1 | 1651537948 | 19ABA65576A061968 | 2019/08/01 14:32:50UTC | 100 | 48.8566969 | 2.3514616 | ON | 3598 | 70 | 14,876 | .5 | .5 | 0 | Yes |
| 410-2 | 1653381266 | 1D4GP21R123685181 | 2019/08/01 14:33:50UTC | 25 | 47.5617011 | -52.7151491 | ON | 1205 | 21 | 70,645 | .10 | .03 | 0 | Yes |
| 410-3 | 1650969255 | 1ZU4A16P66J183214 | 2019/08/01 14:33:60UTC | 67 | 43.6673906 | -79.4347464 | ON | 2376 | 64 | 34,070 | 1 | .08 | 0 | Yes |
| 410-4 | 1653287803 | 1TY0S31L76DA87320 | 2019/08/01 14:33:63UTC | 32 | 49.2608724 | -123.1139529 | ON | 1845 | 37 | 29,463 | .50 | .05 | 0 | Yes |
| | ... | ... | ... | ... | ... | ... | ... | ... | ... | ... | ... | ... | ... | ... |

FIG. 4A

| HWID | VIN | DateTime | Speed km/h | LAT | LONG | Ignition State | RPM | Engine Load % | Odometer km | x-axis g | y-axis g | z-axis g | SeatBelt |
|---|---|---|---|---|---|---|---|---|---|---|---|---|---|
| 1651537948 | 19ABA65576A061968 | 2019/08/01 14:32:50UTC | 100 | 48.8566969 | 2.3514616 | ON | 3598 | 70 | 14,876 | .5 | .5 | 0 | Yes |
| 1651537948 | 19ABA65576A061968 | 2019/08/01 14:33:63UTC | 98 | 48.8783773 | 2.2402250 | ON | 1205 | 21 | 70,645 | .5 | .03 | 0 | Yes |
| 1651537948 | 19ABA65576A061968 | 2019/08/01 14:34:00UTC | 97 | 40.7127281 | -74.0060152 | ON | 2376 | 64 | 34,070 | .8 | .08 | 0 | Yes |
| 1651537948 | 19ABA65576A061968 | 2019/08/01 14:40:68UTC | 70 | 40.7293810 | -74.0705590 | ON | 1845 | 37 | 29,463 | .6 | .05 | 0 | Yes |
| 1651537948 | 19ABA65576A061968 | 2019/08/01 14:42:22UTC | 40 | 36.1672559 | -115.1485163 | ON | 2645 | 73 | 66,801 | .5 | .15 | 0 | Yes |
| 1651537948 | 19ABA65576A061968 | 2019/08/01 14:45:68UTC | 20 | 43.6534817 | -79.3839347 | ON | 2254 | 44 | 103,027 | .3 | .25 | 0 | Yes |
| 1651537948 | 19ABA65576A061968 | 2019/08/01 14:59:11UTC | 0 | 45.4211060 | -75.6903080 | OFF | 0 | 0 | 32,572 | .3 | .3 | 0 | Yes |
| 1651537948 | 19ABA65576A061968 | ... | ... | ... | ... | ... | ... | ... | ... | ... | ... | ... | ... |
| 1651537948 | 19ABA65576A061968 | 2020/02/02 14:60:00UTC | 0 | -24.7952076 | -65.3958674 | OFF | 0 | 0 | 54,381 | .5 | .5 | 0 | Yes |

| | 450 | 451 | 452 | 453 | 454 | 455 | 456 | 457 | 458 | 459 |
|---|---|---|---|---|---|---|---|---|---|---|
| | VIN | Displacement (L) | HP | Vehicle Type | Make | Model | Year | Weight Class | Tank Capacity (L) | Range |
| | 19ABA65576A061968 | 5.7 | 370 | Truck | Dodge | RamPickup | 2013 | Class G (8001 - 9000 lbs) | 98 | unknown |

HWID: 1651537948

FIG. 4C

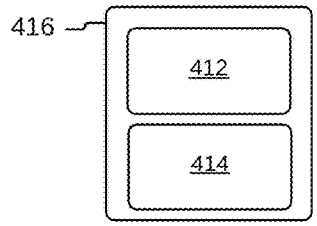

| HWID | First Vehicle-related Data |
|---|---|
| 1651537948 | 416 — 412 414 |
| 1653381266 | First Vehicle-related Data of a vehicle associated with HWID 1653381266 |
| 1650969255 | First Vehicle-related Data of a vehicle associated with HWID 1650969255 |
| 1653287803 | First Vehicle-related Data of a vehicle associated with HWID 1653287803 |
| ... | ... |
| 1753287803 | First Vehicle-related Data of a vehicle associated with HWID 1753287803 |

FIG. 4E

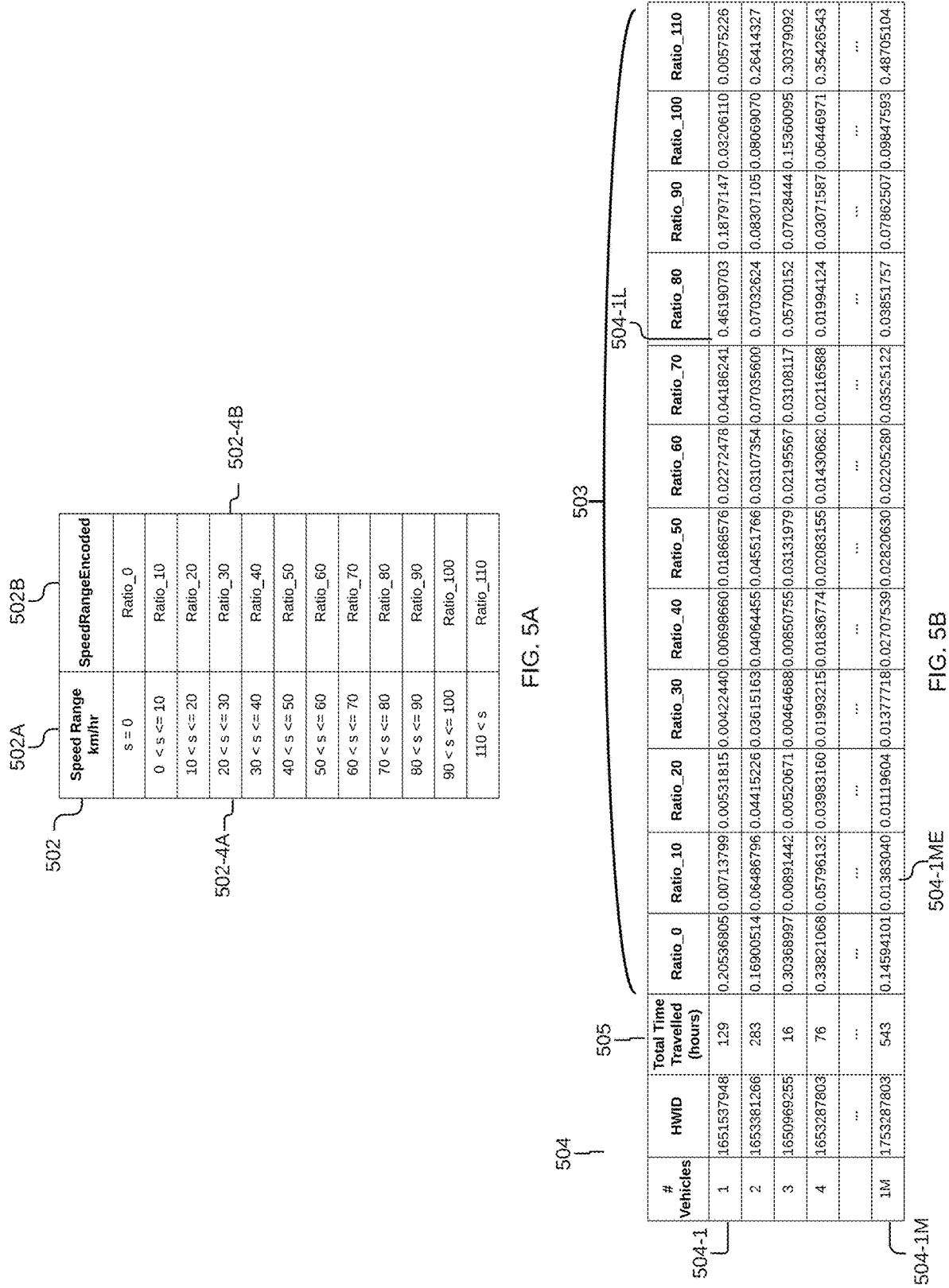

| HWID | Speed_Profile_1st | Speed_Profile_2nd | Speed_Profile_3rd | Speed_Profile_4th |
|---|---|---|---|---|
| 1651537948 | Ratio_80 | Ratio_0 | Ratio_90 | Ratio_70 |
| 1653381266 | Ratio_90 | Ratio_80 | Ratio_70 | Ratio_0 |
| 1650969255 | Ratio_110 | Ratio_0 | Ratio_100 | Ratio_90 |
| 1653287803 | Ratio_110 | Ratio_0 | Ratio_100 | Ratio_10 |
| ... | ... | ... | ... | ... |
| 1753287803 | Ratio_0 | Ratio_90 | Ratio_100 | Ratio_110 |

FIG. 5C

| HWID | Slow_Vehicle |
|---|---|
| 1651537948 | NO |
| 1653381266 | YES |
| 1650969255 | NO |
| 1653287803 | NO |
| ... | ... |
| 1753287803 | NO |

FIG. 6A

| 606 → | Vehicle_Type |
|---|---|
| | Passenger Car |
| | MiniVan |
| | Truck |
| | Other |
| | Bus |
| | Limo |

FIG. 6B

| 608 → | HWID | Vehicle_Type |
|---|---|---|
| 608-1 → | 1651537948 | Truck |
| | 1653381266 | Truck |
| | 1650969255 | Passenger Car |
| | 1653287803 | Bus |
| | ... | ... |
| | 1753287803 | Truck |

FIG. 6C

| 610 → | Total Time Travelled Range (hours) | TripHrsLabel |
|---|---|---|
| | 0 = t | Trip_hrs_0 |
| | 0 < t <= 30 | Trip_hrs_30 |
| 610-3A → | 30 < t <= 60 | Trip_hrs_60 ← 610-3B |
| | 60 < t <= 90 | Trip_hrs_90 |
| | 90 < t <= 120 | Trip_hrs_120 |
| | 120 < t <= 150 | Trip_hrs_150 |
| | 150 < t <= 180 | Trip_hrs_180 |
| | 180 < t <= 210 | Trip_hrs_210 |
| | 210 < t <= 240 | Trip_hrs_240 |
| | 240 < t <= 360 | Trip_hrs_360 |
| | 360 < t <= 480 | Trip_hrs_480 |
| | 480 < t | Trip_hrs_540 |

(columns 610-A and 610-B)

FIG. 6D

| 612 → | HWID | TripHrsEncoded |
|---|---|---|
| | 1651537948 | Trip_hrs_480 |
| | 1653381266 | Trip_hrs_60 |
| 612-3 → | 1650969255 | Trip_hrs_210 |
| | 1653287803 | Trip_hrs_90 |
| | ... | ... |
| | 1753287803 | Trip_hrs_380 |

FIG. 6E

| Displacement Range | Displacement Label |
|---|---|
| d < 2 | Displacement_2 |
| 2 <= d < 5 | Displacement_5 |
| 5 <= d < 7 | Displacement_9 |
| 7 <= d < 11 | Displacement_11 |
| 11 <= d < 13 | Displacement_13 |
| 13 <= d < 15 | Displacement_15 |
| 15 <= d | Displacement_above_15 |

FIG. 6F

| HWID | Displacement_Encoded |
|---|---|
| 1651537948 | Displacement_5 |
| 1653381266 | Displacement_2 |
| 1650969255 | Displacement_11 |
| 1653287803 | Displacement_13 |
| ... | ... |
| 1753287803 | Displacement_5 |

| | 702-A | 702-B | |
|---|---|---|---|
| 702 → | HP Range | HP_RangeLabel | |
| | HP =< 150 | HP_150 | |
| | 150 < HP <= 200 | HP_200 | |
| | 200 < HP <= 250 | HP_250 | |
| | 250 < HP <= 300 | HP_300 | |
| 702-5A → | 300 < HP <= 350 | HP_350 | ← 702-5B |
| | 350 < HP <= 400 | HP_400 | |
| | 400 < HP <= 450 | HP_450 | |
| | HP > 450 | HP_above_450 | |

FIG. 7B

| 704 → | HWID | HP_Encoded |
|---|---|---|
| | 1651537948 | HP_350 |
| | 1653381266 | HP_150 |
| 704-3 → | 1650969255 | HP_250 |
| | 1653287803 | HP_300 |
| | ... | ... |
| | 1753287803 | HP_450 |

FIG. 8A

| 802 → | Weight Class |
|---|---|
| | Class A (3000lbs and under) |
| | Class B (3001 - 4000 lbs) |
| | Class C (4001 - 5000 lbs) |
| | Class D (5001 - 6000 lbs) |
| | Class E (6001 - 7000 lbs) |
| | Class F (7001 - 8000 lbs) |
| | Class G (8001 - 9000 lbs) |
| | Class H (9001 - 10,000 lbs) |
| | Class 3 (10,001 - 14,000 lbs) |
| | Class 4 (14,001 - 16,000 lbs) |
| | Class 5 (16,001 - 19,500 lbs) |
| | Class 6 (19,501 - 26,000 lbs) |
| | Class 7 (26,001 - 33,000 lbs) |
| | Class 8 (33,001 and over) |

FIG.10A — 1010

| HWID | 1651537948 | 1653381266 | 1650969255 | 1653287803 |
|---|---|---|---|---|
| Vehicle Type | Truck | Truck | Passenger Car | Bus |

1010-1: HWID row
1010-2: Vehicle Type row
1010A

FIG.10B — 1014

| | 1651537948 | 1653381266 | 1650969255 | 1653287803 |
|---|---|---|---|---|
| Passenger Car | 0 | 0 | 1 | 0 |
| MiniVan | 0 | 0 | 0 | 0 |
| Truck | 1 | 1 | 0 | 0 |
| Other | 0 | 0 | 0 | 0 |
| Bus | 0 | 0 | 0 | 1 |
| Limo | 0 | 0 | 0 | 0 |

1014A

| # Vehicles | HWID | EF1 | EF2 | EF3 | EF4 | EF5 | EF6 | EF7 | EF8 | EF9 | EF10 | EF11 | EF12 |
|---|---|---|---|---|---|---|---|---|---|---|---|---|---|
| 1 | 1651537948 | 27.67222023 | 17.65599823 | 18.93183327 | 6.920666695 | 25.74355379 | 12.36471462 | 15.91473675 | 34.2938652 | 20.22503471 | 3.81546855 | 19.82078171 | 0 |
| 2 | 1653381266 | 11.99351406 | 9.83995533 | 9.335659027 | 3.513170004 | 11.381381199 | 4.528428555 | 8.216553688 | 10.70876026 | 4.223079681 | 4.964282513 | 7.920426369 | 0 |
| 3 | 1650969255 | 35.42759323 | 43.15116882 | 30.96796227 | 53.8287735 | 33.17705154 | 19.00915718 | 25.950025635 | 45.60815048 | 42.26678467 | 25.28032112 | 17.33397675 | 0 |
| 4 | 1653287803 | 25.989645 | 24.8918705 | 18.97885895 | 40.1695137 | 26.198411576 | 12.34048462 | 21.79446411 | 15.24244881 | 29.78544807 | 25.98399162 | 13.84792805 | 0 |
| ... | ... | ... | ... | ... | ... | ... | ... | ... | ... | ... | ... | ... | ... |
| 1M | 1753287803 | 26.9790287 | 29.00462532 | 49.357758591 | 32.91449356 | 53.64741898 | 10.699002992 | 23.93982887 | 20.07853508 | 28.79083633 | 16.25338554 | 31.68525696 | 0 |

| 1651537948 | 1653381266 | 1650969255 | 1653287803 | ... | 1753287803 |
|---|---|---|---|---|---|
| 1653015656 | 1651730167 | 1651730178 | 1653449010 | ... | 1653234517 |
| 1652545492 | 1651732111 | 1651732178 | 1650659143 | ... | 1650340863 |
| 1651048974 | 1652525469 | 1651731788 | 1651535482 | ... | 1652510427 |
| 1650663624 | 1651731905 | 1652459340 | 1652971153 | ... | 1652481250 |
| 1650664775 | 1651731179 | 1651730853 | 1652970970 | ... | 1653474463 |
| 1650966532 | 1651731292 | 1651731025 | 1650779840 | ... | 1652704857 |
| 1650974180 | 1651729821 | 1652524800 | 1653105899 | ... | 1653378918 |
| 1653480156 | 1652513790 | 1651731935 | 1652546693 | ... | 1650708527 |
| 1650825693 | 1652512607 | 1651731224 | 1651652724 | ... | 1653380892 |
| 1651212319 | 1651729800 | 1651732186 | 1650828685 | ... | 1653132993 |

| Make | Model | Year |
|---|---|---|
| Dodge | RamPickup | 2013 |
| Ford | Five Hundred | 2012 |
| Chevrolet | Uplander | 2014 |
| Pontiac | Montana | 2015 |
| GMC Truck | 4500 Series Medium Duty W4/C4 | 2013 |
| Toyota | Highlander 4WD-Hybrid | 2012 |
| Isuzu | D-Max / LUV D-Max | 2016 |
| GMC | Sierra/Yukon/Yukon XL | 2014 |
| Jeep | Patriot | 2015 |
| Ford | Low Cab Forward | 2014 |

| HWID | Fuel Economy L/100km |
|---|---|
| 1653015656 | 9.16 |
| 1652545492 | 7.88 |
| 1651048974 | 6.07 |
| 1650663624 | 26.7 |
| 1650664775 | 12.48 |
| 1650966532 | 7.54 |
| 1650974180 | 1.25 |
| 1653480156 | 17.57 |
| 1650825693 | 7.52 |
| 1651212319 | 8.04 |

FIG. 13A 1304  1304-B

| Ranking | HWID |
|---|---|
| 1 | 1650974180 |
| 2 | 1651048974 |
| 3 | 1650825693 |
| 4 | 1650966532 |
| 5 | 1652545492 |
| 6 | 1651212319 |
| 7 | 1653015656 |
| 8 | 1650664775 |
| 9 | 1653480156 |
| 10 | 1650663624 |

| Ranking | Make | Model | Year | Fuel Economy L/100km |
|---|---|---|---|---|
| 1 | Dodge | RamPickup | 2013 | 1.25 |
| 2 | Chevrolet | Uplander | 2014 | 6.07 |
| 3 | Isuzu | D-Max / LUV D-Max | 2016 | 7.52 |
| 4 | Jeep | Patriot | 2015 | 7.54 |
| 5 | Ford | Five Hundred | 2012 | 7.88 |
| 6 | Pontiac | Montana | 2015 | 8.04 |
| 7 | GMC Truck | 4500 Series Medium Duty W4/C4 | 2013 | 9.16 |
| 8 | Toyota | Highlander 4WD-Hybrid | 2012 | 12.48 |
| 9 | GMC | Sierra/Yukon/Yukon XL | 2014 | 17.57 |
| 10 | Ford | Low Cab Forward | 2014 | 26.7 |

FIG. 13C

METHOD FOR RECOMMENDING VEHICLES

RELATED APPLICATIONS

This application claims the benefit under 35 U.S.C. § 119(e) to U.S. Provisional Application Ser. No. 63/090,885, titled "Recommending and Ranking Vehicles", filed on Oct. 13, 2020, which is herein incorporated by reference in its entirety.

BACKGROUND

Recommender systems process and filter information for predicting a rating or preference a user would give to an item. Such systems are frequently implemented for commercial purposes. For instance, a service provider and/or vendor may suggest to a customer an item that has been highly ranked for that customer in an effort to make a new sale or to maintain the customer's satisfaction level with their service. Recommender systems are utilized in a variety of industries.

One type of recommender system uses a method known as content-based filtering. In this type of system there is known data on the item and a user profile is built based on the users behaviour and interaction with the recommender system. In this system, keywords are used to describe the items and a user profile is built to indicate the type of item this user likes. Algorithms are used to try to recommend items that are similar to those that a user liked in the past. In general, content-based recommenders learn the users likes and dislikes based on an item's features.

A content-based filtering recommender system may be implemented by a video streaming service provider, such as Netflix®. Data about films, i.e., movies and/or tv shows, may include, film category, e.g., action, drama, foreign film, comedy, actors . . . , film language, e.g., English, French, Spanish . . . , film format, e.g., movie, mini-series, tv show . . . , among other film attributes. A user profile may be built using information explicitly provided by the user, such as a film ranking, e.g., thumbs up/down, numerical score, e.g., 5/10, number of stars, e.g., 4/5 stars. Information to build a user profile is also based on a user's behaviour. Such as, the categories of film the user watches most frequently, favoured actors, whether or not a user watches a film to completion, among others. Such service providers implement recommender systems for recommending films that are similar to those the user liked in the past.

Shown in FIG. 1A is a simple conceptual diagram of an exemplary content-based filtering recommender system 100. In this example, user 102 subscribes to a video streaming service provider and in the past has watched film 103, as indicated by arrow 107. Recommender system 100 has built a user profile for user 102 based on their viewing of film 103. Furthermore, recommender system 100 has identified a film 104 with similar attributes as film 103, as indicated by arrow 106. Based on the profile of user 102 and data known about film 103, recommender system 100 recommends film 104 to user 102, as indicated by arrow 108. The user will frequently see a list of films with a heading such as, 'Because you watched film x.' The films on the list were determined by the recommender system to have similar attributes as previous films watched by the user.

For each user, the video streaming service has information regarding, different films watched by the user, and thus has information based on 1: N information. (e.g., one user: many different products). To create a machine learning based recommender system, features for training could be generated from the (N) information associated with each user.

Another type of recommender system uses a method known as collaborative filtering. In this type of system there is an assumption that people who agreed in the past will agree in the future, and that they will like similar kinds of items they liked in the past. The system generates recommendations using only information about rating profiles for different users or items. By grouping like users/items with a rating history similar to the current user or item, they generate recommendations using these groupings. A key advantage of the collaborative filtering approach is that it does not rely on machine analyzable content and therefore it is capable of accurately recommending complex items such as films without knowing any data about the films. A collaborative filtering recommender system builds a model from a users behavior. The data collected may come in the form of explicit and implicit forms of data collection. Examples of explicit data collection include requesting a user to rank an item and/or rank a collection of items from favorite to least favorite and presenting two items to a user and asking them to choose their preferred item. Examples of implicit data collection include, observing the items that a user views in an online store, analyzing user viewing time of an item, keeping a record of the items that a user purchases online, obtaining a list of items that a user has listened to or watched on his/her computer, analyzing the users social network and discovering similar likes and dislikes.

A collaborative filtering recommender system may be used by an online sales platform, such as Amazon®. For example, when looking at an item on Amazon.com, the user will frequently see a banner informing them that people who buy x also buy y. For each customer, Amazon® has information regarding, for example, different items purchased by users, and thus has information based on 1: N information. (e.g., one customer: many different products). To create a machine learning based recommender system, features for training could be generated from the (N) information associated with each customer.

Shown in FIG. 1B is a simple conceptual diagram of an exemplary collaborative filtering recommender system 120. Based on explicit and implicit user data collected and processed by recommender system 120, users 102 and 109 have been identified as like users, as represented by arrow 112. For example, both user 102 and 109 purchased multiple same items 110 from an online sales platform, as indicated by arrows 113 and 114, respectively. User 102 further purchases item 111 from the online sales platform as indicated by arrow 115. As collaborative filtering recommender systems assume that people who agreed in the past will agree in the future, recommender system 120 recommends item 111 to user 109 as indicated by arrow 116.

Other types of recommender systems are hybrids implementing both content-based and collaborative filtering.

SUMMARY

According to a first broad aspect there is provided a method for recommending a second plurality of vehicles similar to a first vehicle comprising: for each vehicle of a first plurality of vehicles, generating a plurality of features, the plurality of features based on and/or derived from at least one of historical vehicle data and manufacturer data associated therewith; using at least one machine learning technique for selecting the second plurality of vehicles from the first plurality of vehicles similar to the first vehicle; and for each vehicle of the second plurality of vehicles, providing descriptive data indicative of at least a make, a model, and manufacture year thereof. The historical vehicle data may include a plurality of raw vehicle data instances indicative of vehicle operation information collected over a period of time. The manufacturer data may include data indicative of vehicle manufacturer specification information. The method may further include receiving historical data from one at least one of a datastore and data management system. The method may include generating a plurality of features for a vehicle of the first plurality of vehicles may include generating the plurality of features based on and/or derived from at least one of historical vehicle data and manufacturer data associated therewith, the at least one of historical vehicle data and the manufacturer data other than including data indicative of a make, model and/or year of the vehicle. The plurality of features may include categorical features.

According to an embodiment the provided method may include generating at least a first feature of the plurality of features for a vehicle of the first plurality of vehicles includes, processing speed data of historical vehicle data for determining whether a vehicle has one of met and exceeded a predetermined speed; and generating the at least a first feature indicating whether the vehicle has one of met and exceeded a maximum speed. Generating at least a first feature of the plurality of features for a vehicle of the first plurality of vehicles includes generating a first feature indicative of a vehicle type indicated in the manufacturer data associated with the vehicle.

Generating at least a first feature of the plurality of features for a vehicle of the first plurality of vehicles may include, defining a plurality of total time travelled ranges and assigning a second label to each thereof; processing historical vehicle data for determining a total time travelled by a vehicle; and generating the at least a first feature including a second label assigned to a total time travelled range corresponding to the total time travelled by the vehicle. Generating at least a first feature of the plurality of features for a vehicle of the first plurality of vehicles may include, defining a plurality of displacement ranges and assigning a third label to each thereof; processing manufacturer data for determining a displacement associated with the vehicle; and generating the at least a first feature including a third label assigned to a displacement range corresponding to the displacement associated with the vehicle. Generating at least at least a first feature of the plurality of features for a vehicle of the first plurality of vehicles may include, defining a plurality of horsepower ranges and assigning a fourth label to each thereof; processing manufacturer data for determining a horsepower of the vehicle; and generating the at least a first feature including a fourth label assigned to a horsepower range corresponding to the horsepower associated with the vehicle. The method provided may further include providing descriptive data indicative of at least a make, model and year of each vehicle in the second plurality of vehicles. Generating at least at least a first feature of the plurality of features for a vehicle of the first plurality of vehicles may include, processing manufacturing data associated with the vehicle for determining whether weight class data indicates a weight class; dependent on the weight class data associated with the vehicle indicating a weight class, generating the at least a feature indicating the weight class; and dependent on the weight class data associated with the vehicle other than indicating a weight class, generating the at least a feature indicating an unknown weight class and vehicle type associated with the vehicle.

According to another embodiment the method provided includes generating at least a first feature of the plurality of features for a vehicle of the first plurality of vehicles including, defining a plurality of speed ranges and assigning a first label to each thereof; processing historical vehicle data for determining a speed-time ratio corresponding to each of the plurality of speed ranges, the speed-time ratio indicating a ratio of a total time travelled by the vehicle within a speed range of the plurality of speed ranges; and generating at least a first feature including a first label assigned to a speed range dependent on a speed-time ratio corresponding thereto. Generating the at least a first feature including a first label assigned to a speed range dependent on a speed-time ratio corresponding thereto includes generating at least a first feature including a first label assigned to a speed range associated with a highest speed-time ratio. Generating the at least a first feature of the plurality of features may include generating a Speed Profile 1st feature, Speed Profile 2nd feature, Speed Profile 3rd feature, and Speed Profile 4th feature, indicative of a first label assigned to a speed range corresponding to a highest speed-time ratio, a first label assigned to a speed range corresponding to a second highest speed-time ratio, a first label assigned to a speed range corresponding to a third highest speed-time ratio, and a first label assigned to a speed range corresponding to a fourth highest speed-time ratio, respectively.

According to another embodiment the method provided includes ranking each vehicle of the second plurality of vehicles according to evaluation data associated therewith. Descriptive data may include an indication of the ranking of each vehicle in the second plurality of vehicles. Evaluation data may include data indicative of one of vehicle fuel efficiency and vehicle safety.

According to another embodiment the method provided includes generating at least a first feature of the plurality of features for a vehicle of the first plurality of vehicles including processing LAT data and LON data of historical vehicle data associated with the vehicle, each of the LAT data and LON data indicative of a GPS position; mapping each GPS position to a plurality of cells of a geospatial hierarchy indexing system; determining a first cell of the plurality of cells to which most GPS positions are mapped thereto; and generating the at least a first feature indicative of the first cell. The geospatial hierarchy indexing system may include Geohash.

According to another embodiment the method provided includes using at least one machine learning technique for selecting the second plurality of vehicles from the first plurality of vehicles similar to the first vehicle may including, generating a high-dimensional vector for each vehicle of the second plurality of vehicles based on the plurality of features generated for each thereof; providing the high-dimensional vector associated with each vehicle of the first plurality of vehicles to a neural network; forming by the neural network a plurality of low-dimensional encoded vectors, each associated with a vehicle of the first plurality of vehicles; processing the plurality of low-dimensional encoded vectors associated with the first vehicle and each vehicle of the first plurality of vehicles by a distance function for determining a relative distance therebetween, the relative distance therebetween indicative of a similarity score to the first vehicle; and selecting a second plurality of n vehicles from the first plurality of vehicles based on vehicles from the first plurality of vehicles having one of n lowest similarity scores to the first vehicle. Generating a high-dimensional vector for each vehicle of the first plurality of vehicles based on the plurality of features generated for each thereof may include encoding the plurality of features associated with each vehicle of the plurality of vehicles using a one hot encoding technique for generating the high-dimensional vector. The neural network may include an autoencoder. The distance function may include one of cosine, Euclidean, Seuclidean and Minkowski.

BRIEF DESCRIPTION OF DRAWINGS

Embodiments of the invention are now described by way of non-limiting example and are illustrated in the following figures in which like reference numbers indicate like features, and wherein:

FIG. 3B is another simplified block diagram of an exemplary network configuration with which some embodiments may operate;

FIG. 4A illustrates exemplary raw vehicle data included in historical vehicle data;

FIG. 4B is exemplary historical vehicle data associated with a vehicle;

FIG. 4C is exemplary manufacturer data associated with a vehicle;

FIG. 4D is a conceptual diagram of first vehicle-related data comprising historical vehicle data and manufacturer data;

FIG. 4E is a conceptual diagram of first vehicle-related data for each vehicle of the plurality of vehicles;

FIG. 5A illustrates exemplary speed ranges;

FIG. 5B shows exemplary speed-time ratio data;

FIG. 5C is a table showing exemplary values of Speed_Profile_1st, Speed_Profile_2nd, Speed Profile 3rd and Speed Profile 4th features generated by a recommender system for each vehicle in the plurality of vehicles;

FIG. 6A is table illustrating exemplary values of a Slow_Vehicle feature for each vehicle in the plurality of vehicles generated by a recommender system;

FIG. 6B illustrates a list of exemplary vehicle types;

FIG. 6C illustrates exemplary values of Vehicle_Type features for each of the plurality of vehicles;

FIG. 6D illustrates exemplary time ranges;

FIG. 6E show exemplary TripHoursEncoded features generated by a recommender system;

FIG. 6F shows exemplary displacement ranges;

FIG. 6G shows exemplary Displacement_Encoded features generated by a recommender system;

FIG. 7A illustrates exemplary horsepower ranges;

FIG. 7B shows exemplary HP_Encoded features generated by a recommender system;

FIG. 8A is a list of exemplary weight classes of vehicles;

FIG. 10A shows exemplary values of Vehicle_Type features for four vehicles;

FIG. 10B shows exemplary values of high-dimensional vectors;

FIG. 11B show exemplary embedded vectors provided at an embedding layer of an autoencoder;

FIG. 12B shows HWIDs of the most similar vehicles to a first vehicle;

FIG. 12C is a conceptual diagram of descriptive data indicating 10 vehicles most similar to a first vehicle;

FIG. 13A shows exemplary fuel efficiency indicated by fuel efficiency data associated with vehicles most similar to a first vehicle;

FIG. 13B illustrates a HWID associated with, and ranking position of, 10 vehicles;

FIG. 13C is a conceptual diagram of descriptive data provided to a first fleet manager indicating vehicles most similar to the vehicle;

DESCRIPTION

Some embodiments described herein relate to a methods and systems for recommending a plurality of vehicles similar to a first vehicle based on telematic data indicative of vehicle operating information of vehicles from a fleet of vehicles. For example, for recommending one or more vehicles similar to a first vehicle in a fleet to a fleet manager.

In contrast with techniques implemented by other recommender systems, embodiments described herein relate to methods for recommending a plurality of vehicles similar to a first vehicle not based on user/operator data, 1: N information. (e.g., one user: many different vehicles), or data associated with any individual user/operator.

Recommending a plurality of vehicles similar to a first vehicle based many include using one or more machine learning techniques including feature creation based on, and/or derived from, vehicle operating data and vehicle manufacturing data associated with a plurality of vehicles.

Some embodiments described herein relate to a telematics vehicle recommender system implementing a machine learning model for predicting a subset of a plurality of vehicles similar to a particular vehicle. For example, the vehicle recommender system recommends vehicles similar to a particular vehicle based on a prediction thereby.

Some other embodiments described herein relate to an intelligent telematics system implementing a machine learning model for predicting a subset of a plurality of vehicles similar to a particular vehicle.

Figure 3A:
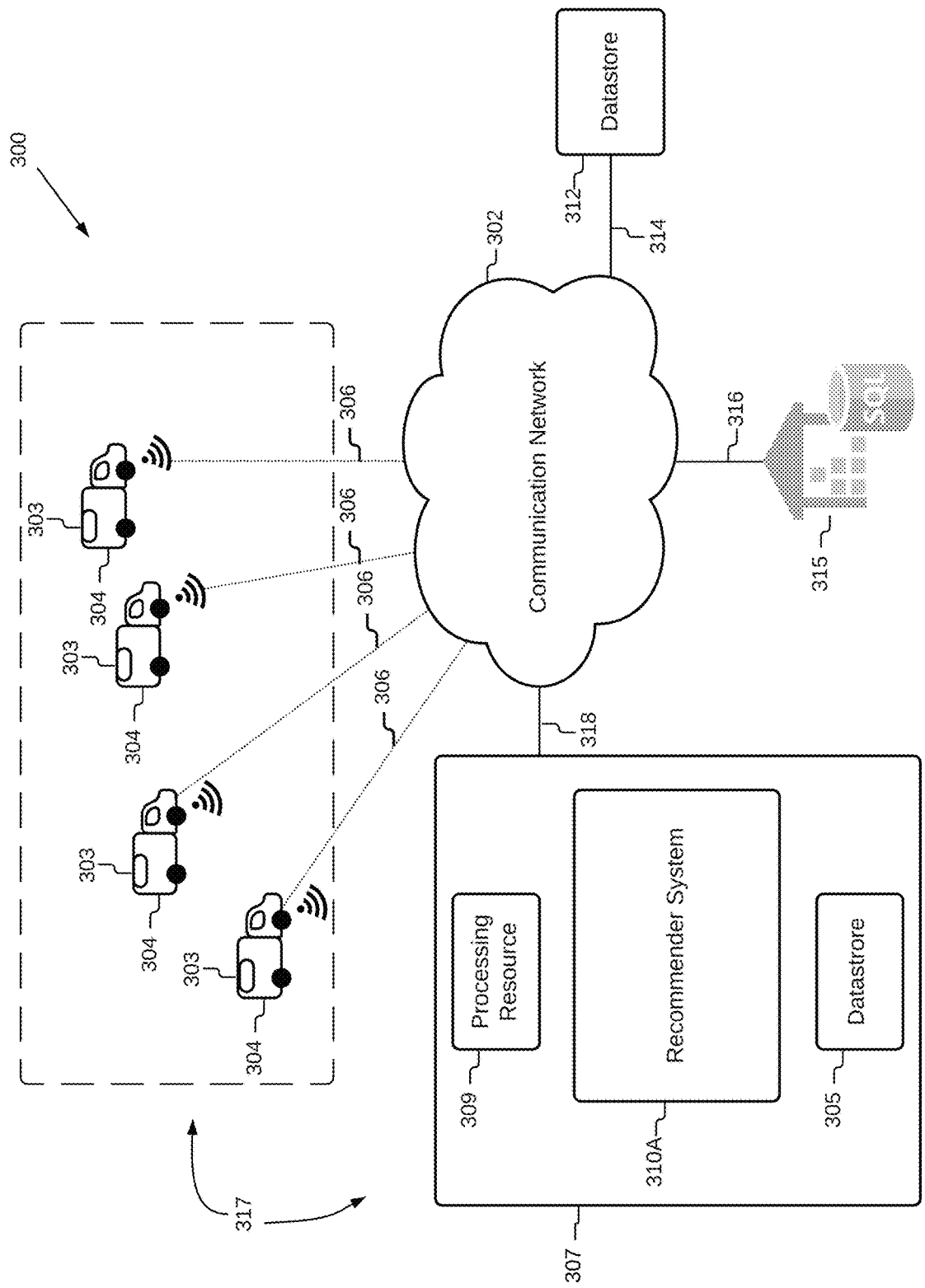
FIG. 3A is a simplified block diagram of an exemplary network configuration with which some embodiments may operate.

Shown in FIG. 3A is simplified block diagram of an exemplary network configuration 300 with which some embodiments may operate.

Network configuration 300 includes an intelligent telematics system 317, comprising a remote system, such as, remote system 307 and a plurality of onboard monitoring devices, such monitoring devices 303. Remote system 307 and the plurality of onboard monitoring devices 303 are communicatively coupled with communication network 302 via communication links 318 and 306, respectively. A monitoring device collects and intermittently transmits vehicle operation information. In this example, monitoring devices 303 are on board vehicles 304 and each thereof transmits vehicle operation information of a corresponding vehicle 304. Remote system 307 and monitoring devices 303 are each configured to communicate with communication network 302, enabling communication therebetween.

In this example, remote system 307 comprises a processing resource 309, datastore 305, and a recommender system, such as, recommender system 310A. Alternatively, and/or additionally, remote system 307 comprises one or more of servers, datastores, gateways and other devices, configured in a centralized, distributed or other arrangement. For descriptive purposes, recommender system 310A is represented as a single component/subsystem of remote system 307 of telematics system 317. A person of ordinary skill will appreciate that steps performed by recommender system 310A described herein may be implemented by one or more devices of remote system 307.

Optionally, network configuration 300 includes a datastore, such as datastore 312, and data management system, such as data management system 315, communicatively coupled with communication network 302 via communication links 314 and 316, respectively. Datastore 312 and data management system 315 are each configured to communicate with communication network 302, enabling communication between each thereof and remote system 307 and monitoring devices 303.

According to an embodiment, a monitoring device collects and intermittently transmits vehicle operation information in the form of raw vehicle data. Raw vehicle data collected over a period of time forms historical vehicle data. For example, historical vehicle data may be formed by collecting raw vehicle data over 3 months, 6 months, 12 months, or other period of time.

According to an embodiment, a monitoring device communicates with a vehicle data/communication bus of a vehicle and/or sensors monitoring systems of vehicle. For example, monitoring device may comprise an interface operable to communicate with a data/communication bus of a vehicle. An exemplary vehicle data/communication bus may operate according to an established data bus protocol, such as the Controller Area Network bus (CAN bus) protocol that is widely used in the automotive industry for implementing a distributed communications network in a vehicle. A monitoring device may communicate via a direct connection, such as, electrically coupling, with a data/communication bus of a vehicle via a vehicle communication port, (e.g., diagnostic port/communication bus, OBDII port). Alternatively, a monitoring device may comprise a wireless communication interface for communicating with a wireless interface of the data/communication bus of vehicle. In other instances, a monitoring device may be an integral component of a communications network in a vehicle. For example, a monitoring device may be integrated in the same manner as an ECU on a CAN bus. Optionally, a monitoring device may communicate with other external devices/systems that detect operating conditions of the vehicle.

In general, a vehicle may include various control, monitoring and/or sensor modules for detecting vehicle operating conditions. Some specific and non-limiting examples include, an engine control unit (ECU), a suspension and stability control module, a headlamp control module, a windscreen wiper control module, an anti-lock braking system module, a transmission control module, and a braking module. A vehicle may have any combination of control, monitoring and/or sensor modules. A vehicle may include a data/communication bus accessible for monitoring vehicle operating information, provided by one or more vehicle control, monitoring and/or sensor modules. A vehicle data/communication bus may operate according to an established data bus protocol, such as the Controller Area Network bus (CAN-bus) protocol that is widely used in the automotive industry for implementing a distributed communications network. Specific and non-limiting examples of vehicle operation information provided by vehicle monitoring and/or sensor modules include, ignition state, fuel tank level, intake air temp, and engine RPM among others.

A monitoring device may comprise sensing modules configured for sensing and/or measuring a physical property that may indicate an operating condition of a vehicle and transmits raw vehicle data indicative thereof. For example, sensing modules may sense and/or speed, direction, rates of acceleration or deceleration, for instance, along the x-axis, y-axis, and/or z-axis, altitude, orientation, movement in the x, y, and/or z direction, ignition state, transmission and engine performance, among others. One of ordinary skill in the art will appreciate that these are but a few types of vehicle operating conditions that may be detected.

A monitoring device may comprise a sensing module for determining a vehicles position, (e.g., GPS coordinates). For instance, the sensing module may utilize Global Positioning System (GPS) technology (e.g., GPS receiver) for determining the geographic position (Lat/Long coordinates) of vehicle 304. Alternatively, the sensing module utilizes another global navigation satellite system (GNSS) technology, such as GLONASS or BeiDou. Alternatively, the sensing module may further utilize another kind of technology for determining geographic position. In addition, the sensing module may provide other vehicle operating information, such as speed.

Alternatively, vehicle position information may be provided according to another geographic coordinate system, such as, Universal Transverse Mercator, Military Grid Reference System, or United States National Grid.

A monitoring device may be configured to wirelessly communicate with a remote system of a telematics system and/or a vehicle monitoring system via a wireless communication link.

For instance, monitoring device 303 is coupled to communications network 302 via a wireless communication link 306 for communicating with one or more of remote network 307, datastore 312 and data management system 315.

In a first example, raw vehicle data is intermittently transmitted by the plurality of monitoring devices 303 to remote system 307 and is stored thereby, for example, in local datastore 305. Over a period of time, raw vehicle data collected and stored by remote system 307 forms historical data.

In a second example, remote system 307 forwards raw vehicle data received from the plurality of monitoring devices 303 to datastore 312 and/or data management system 315 via communication network 302. Over a period of time, raw vehicle data collected and stored thereby forms historical data. Datastore 312 and/or data management system 315 may transmit historical vehicle data to remote system 307 and is stored thereby, for example, in a local datastore 305, for use.

In a third example, monitoring devices 303 are configured to transmit raw vehicle data directly to datastore 312 and/or data management system 315 for storage thereby. Over a period of time, raw vehicle data collected and stored by datastore 312 and/or data management system 315 forms historical data. Datastore 312 and/or data management system 315 may transmit historical vehicle data to remote system 307 and is stored thereby, for example, in a local datastore 305, for use.

The plurality of vehicles 304 shown in FIG. 3A may include vehicles from one or more vehicle fleets. In this example, the plurality of vehicles 304 comprises four vehicles for descriptive purposes only. In practise, however, a plurality of vehicles may include hundreds, thousands, millions or another number of vehicles.

Shown in FIG. 3B is a simplified block diagram of another exemplary network configuration 301 with which some embodiments may operate.

Network configuration 301 includes a recommender system, such as recommender system 310B, datastore 312 and/or data management system 315, and communication network 302 communicatively coupled therewith via communication links 308, 314 and 316, respectively. Recommender system 310B, datastore 312, and data management system 315, and are each configured to communicate with communication network 302, enabling recommender system 310B to communicate with datastore 312 and data management system 315.

According to an embodiment, one or more telematics and/or vehicle monitoring system(s), may receive and store raw vehicle data transmitted thereto by one or more pluralities of monitoring devices. The one or more pluralities of monitoring devices may be coupled to vehicles of one or more vehicle fleets. Over a period of time, raw vehicle data stored by the one or more telematics and/or vehicle monitoring system(s) forms historical data.

For example, one or more telematics and/or vehicle monitoring system(s) stores historical vehicle data in datastore 312. Additionally, and/or alternatively, the one or more telematics and/or vehicle monitoring system(s) stores historical vehicle data in data management system 315. Recommender system 310B may receive historical vehicle data stored in datastore 321, data management system 315, or both, for processing.

According to an embodiment, recommender system 310A and/or remote system 307 is configured to interoperate with data management system 315 for obtaining data stored therein and managed thereby. According to another embodiment, recommender system 310B is configured to interoperate with data management system 315 for obtaining data stored therein and managed thereby.

An exemplary data management system manages and stores large volumes (e.g., big data) and multiple types of data. For example, a data management system may comprise a relational database, for storing historical vehicle data, or a portion thereof, collected by one or more telematics or vehicle monitoring systems. In some instances, a data management system may include a web service that enables interactive analysis of large datasets stored in a remote datastore. An example of such a data management system is a managed cloud data warehouse for performing analytics on data stored therein, such as BigQuery™ available from Google® of Mountain View, Calif., USA.

Block Diagram of Monitoring Device

Figure 3C:
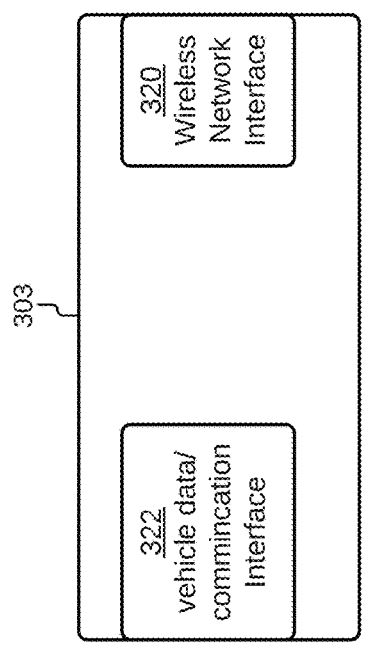
FIG. 3C is a simplified exemplary block diagram of a monitoring device.

Now referring to FIG. 3C, shown is a simplified exemplary block diagram of a monitoring device, for example, monitoring device 303, comprising wireless network interface 320, for communicating wirelessly to, for example, communication network 302 via communication link 306. Exemplary monitoring device 303 further includes a vehicle data/communication interface 322 for communicating with a vehicle data/communication bus of vehicle 304. For example, for electrically coupling therewith via a vehicle communication port.

Block Diagram of Recommender System

Figure 3D:
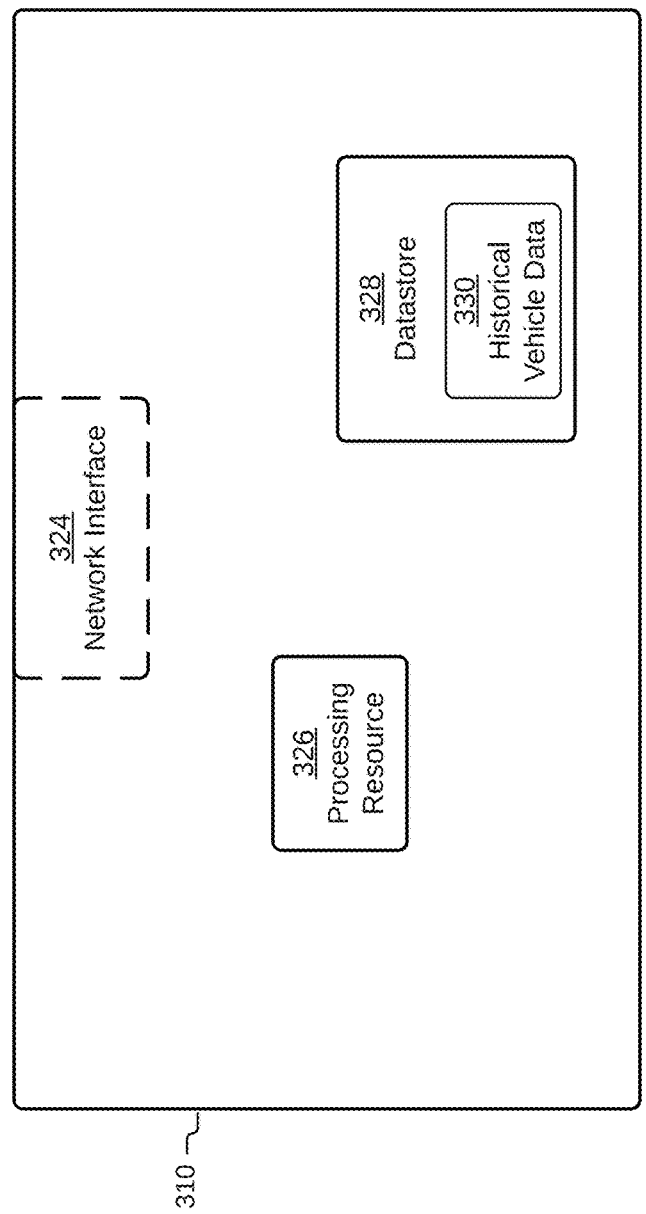
FIG. 3D is a simplified exemplary block diagram of an exemplary recommender system.

Shown in FIG. 3D is a simplified exemplary block diagram of exemplary recommender system 310 comprising a processing resource 326 and datastore 328. Recommender system 310B may also comprise a network interface 324. For instance, in network configuration 301, network interface 324 enables recommender system 310B to communicate with communication network 302 via communication link 308.

Additionally, and/or alternatively, recommender system 310B may comprise a plurality of servers, datastores, processing resources, and/or other devices, configured in a centralized, distributed or other arrangement.

A telematics and/or vehicle monitoring system may assign a monitoring device, or a functional equivalent thereof, a unique identifier. In the present example, each monitoring device 303 is assigned a unique hardware ID (HWID). Furthermore, each monitoring device 304 is associated with a single vehicle 404. Correspondingly, each vehicle 304 may be identified by a telematics system, vehicle monitoring system, and/or recommender system 310 according to a HWID associated therewith.

In a first example, recommender system 310 receives historical vehicle data, such as historical vehicle data 330, associated with a plurality of vehicles from data management system 315 and stores historical vehicle data 330 in datastore 328 for processing, as shown.

Alternatively, and/or additionally, recommender system 310 receives historical vehicle data, such as historical vehicle data 330, associated with a plurality of vehicles from datastore 312 and stores historical vehicle data 330 in datastore 328 for processing, as shown.

Raw Vehicle Data

FIG. 4A illustrates exemplary raw vehicle data 410, for example, included in historical vehicle data 330. Each instance of raw vehicle data 410 corresponds to a specific vehicle and includes HWID data 430 indicative of a HWID assigned to a monitoring device that transmitted the instance of raw vehicle data 410. For example, raw data instance 410-1 was transmitted by a monitoring device having a HWID 1651537948, which uniquely identifies a vehicle associated therewith.

Raw vehicle data 410 may include one or more of the following: vehicle information number (VIN) data 431, DateTime data 432, indicating a date and time an instance was logged by a monitoring device, vehicle speed data 433, latitude (LAT) data 434 and longitude (LONG) data 435, e.g., GPS position of the vehicle, vehicle ignition state data 436, indicating whether the vehicle ignition is on or off, revolutions per minute (RPM) data 437 indicating the RPM of the crankshaft of a vehicle, engine load data 438, odometer data 439, data indicative of gravitational forces exerted on a vehicle, for example, as measured by an accelerometer on the x, y, and z axes, including x-axis data 440, y-axis data 441 and z-axis data 442, and seatbelt data 443 indicative of whether a seatbelt(s) is in use, as shown.

Additionally, and/or alternatively, other data indicative of other vehicle operating information may be included in raw vehicle data 410.

Four raw vehicle data instances, 410-1, 410-2, 410.-3 and 410-4, are described in the above example for descriptive purposes. In practise, hundreds, thousands, millions or more raw vehicle data instances may be included in historical vehicle data.

According to an embodiment, historical vehicle data includes raw data instances relating to a plurality of vehicles that may be located in different areas, cities, countries, and operate to serve a variety of industries.

Historical vehicle data may include historical vehicle data related to thousands, tens of thousands, hundreds of thousands, millions, or another number of vehicles. In the present example, historical vehicle data 330 includes historical vehicle data related to 1 million vehicles.

Now referring to FIG. 4B, shown is exemplary historical vehicle data 412 associated with a vehicle corresponding to HWID 1651537948. In this example, recommender system 310B selected a subset of raw vehicle data 410 instances associated with HWID 1651537948 from historical vehicle data 330. Each instance of historical vehicle data 412 includes HWID data 430a, vehicle information number (VIN) data 431a, DateTime data 432a, indicating a date and time an instance was logged by a monitoring device, vehicle speed data 433a, LAT data 434a and LONG data 435a, e.g., GPS position of the vehicle, vehicle ignition state data 436a, indicating whether the ignition is on or off, revolutions per minute (RPM) data 437a, indicating the RPM of the crankshaft of a vehicle, engine load data 438a, odometer data 439a, data indicative of gravitational forces exerted on a vehicle, for example, as measured by an accelerometer on the x, y, and z axes, including x-axis data 440a, y-axis data 441a and z-axis data 442a, and seatbelt data 443a indicative of whether seatbelt(s) are in use, as shown.

Historical vehicle data 412 is shown organized according to date and time. For example, recommender system 310 may process DateTime data 432a of each instance of historical vehicle data 412 and organize the instances temporally.

In this example, historical vehicle data 412 includes 5000 raw vehicle data FOr instances 412 collected over approximately a 6 month period. For example, a first raw vehicle data instance 412-1 was collected on Aug. 1, 2019 as indicated by DateTime data 412-1C. A last raw vehicle data instance 412-5000 was collected on Feb. 6, 2020, as indicated by DateTime data 412-5000C.

Process 200

Figure 1A:
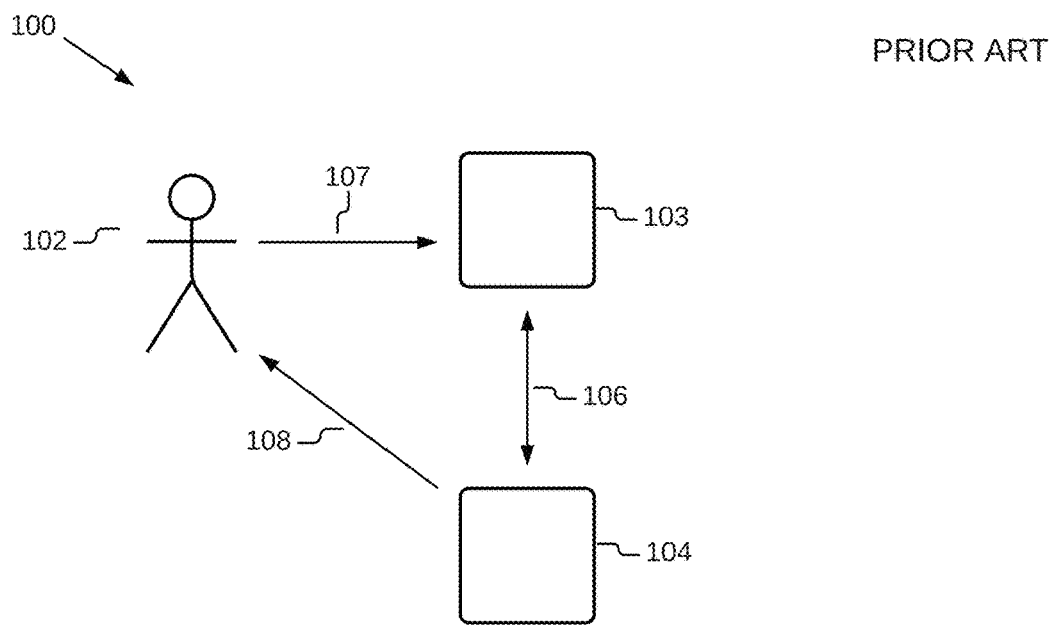
FIG. 1A is a simple conceptual diagram of an exemplary content-based filtering recommender system.
Figure 1B:
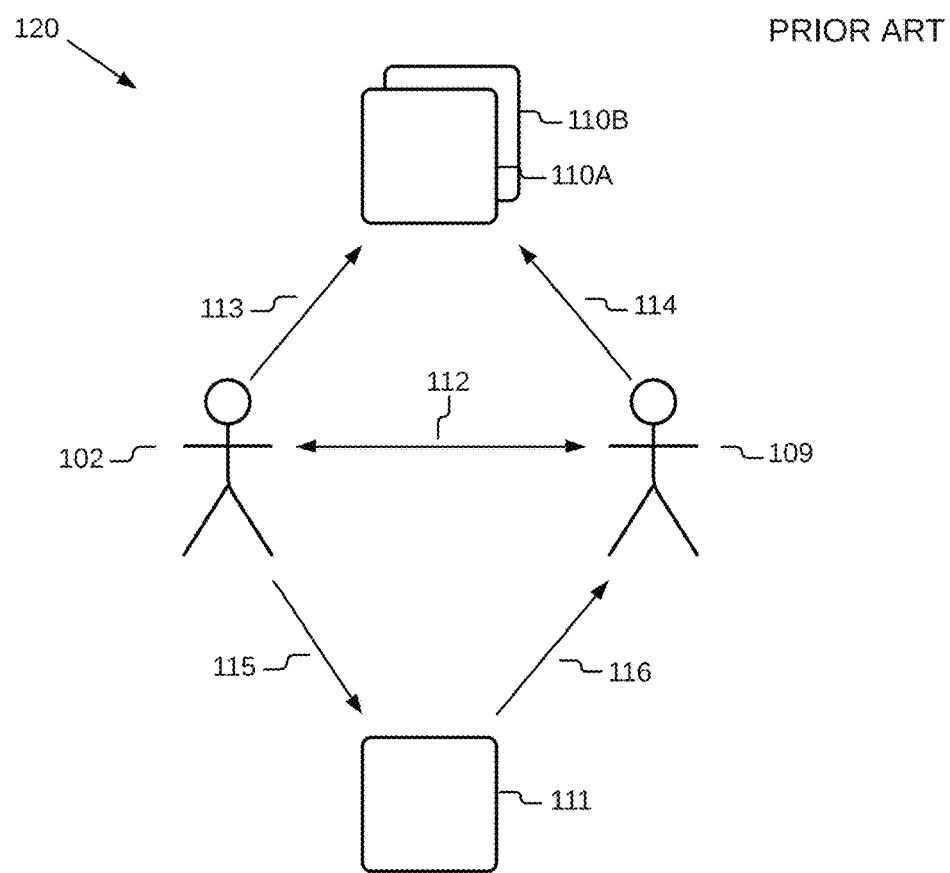
FIG. 1B is a simple conceptual diagram of an exemplary collaborative filtering recommender system.
Figure 2:
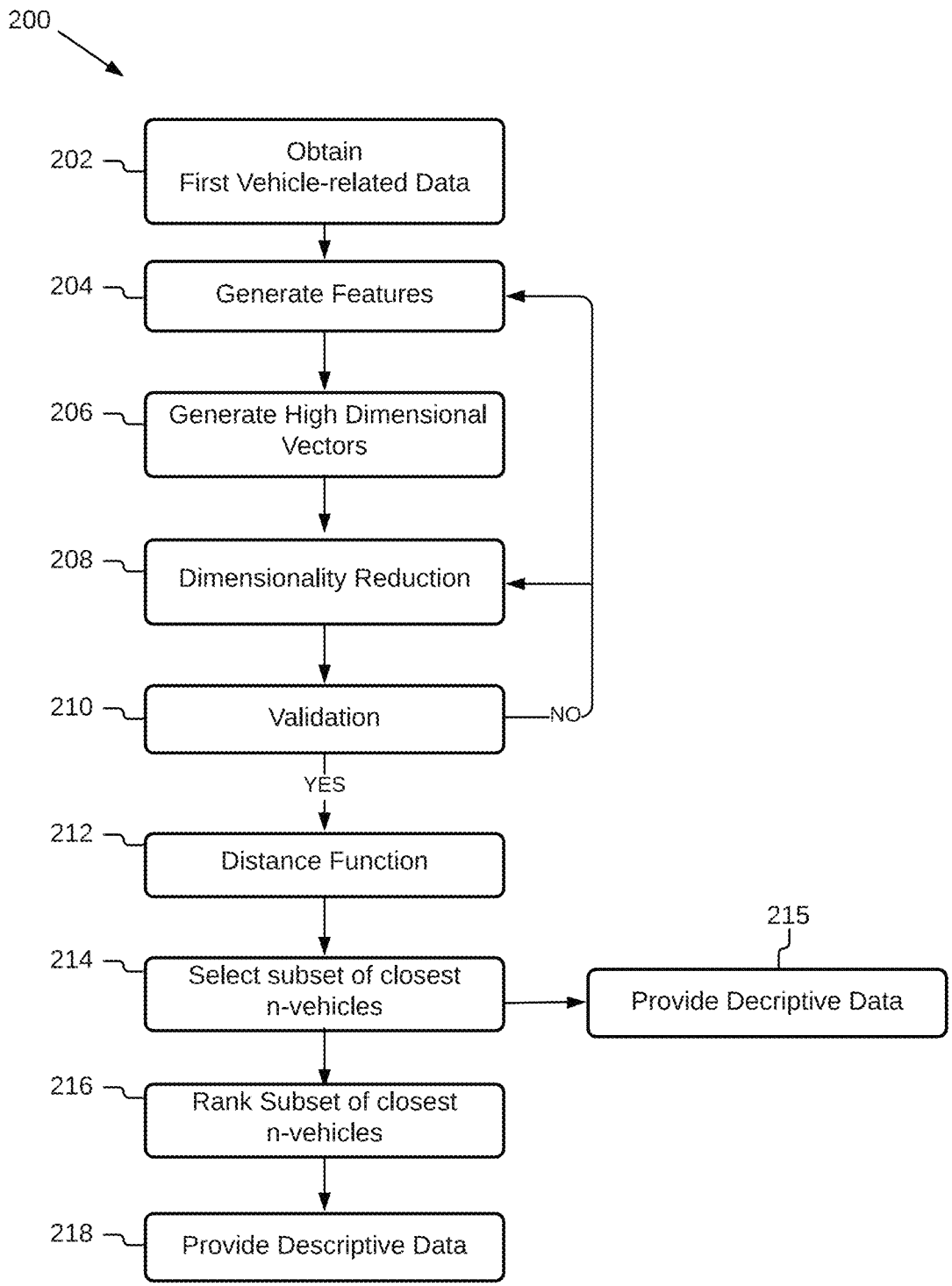
FIG. 2 is a flow diagram of a method for recommending vehicles similar to a first vehicle.

Shown in FIG. 2 is a flow diagram of process 200 for recommending a second plurality of vehicles similar to a first vehicle. Optionally, process 200 includes ranking each vehicle in the second plurality of vehicles based on evaluation data associated therewith.

As described hereinabove, a recommender system may be a standalone system, e.g., recommender system 310B. Alternatively, a recommender system is integrated in an intelligent telematics system, e.g., recommender system 310A, and may be considered a subsystem or component thereof.

Alternatively, process 200 may be carried out by recommender system 310, recommender system 310A, an intelligent telematics system 307, by another system, a combination of other systems, subsystems, devices or other suitable means provided the operations described herein are performed. Process 200 may be automated, semi-automated and some blocks thereof may be manually performed.

Block 202

Starting at block 202, process 200 includes obtaining first vehicle-related data associated with each vehicle of a first plurality of vehicles.

According to an embodiment, first vehicle-related data includes historical vehicle data and manufacturer data for each of the first plurality of vehicles included in the historical vehicle data.

Manufacturer data includes vehicle manufacturer specification information of a vehicle. Examples of vehicle manufacturer specification information include engine displacement, horsepower, vehicle type, make, model, year, weight class, tank capacity, and range, among others.

In the present example, recommender system 310B accesses pre-compiled VIN look up table(s) including manufacturer data associated with a vehicle's VIN. Recommender system 310B may store VIN look up tables, for example in datastore 328. Alternatively, and/or additionally, a VIN look up table(s) is available on a remote server(s) accessible by recommender system 310B via communication network 302. Alternatively, and/or additionally manufacturer data is accessible by recommender system 310B in another manner.

For example, recommender system 310B accesses a VIN look up table stored in datastore 328 for obtaining manufacturer data of a vehicle corresponding to HWID 1651537948 and VIN 19ABA65576A061968, as indicated in raw vehicle data instance 412-1. Exemplary manufacturer data 414 obtained by recommender system 310B is shown in FIG. 4C. Manufacturer data 414 includes VIN data 450, displacement data 451, indicative of engine displacement in liters, horsepower data 452, vehicle type data 453, make data 454, model data 455, year data 456, Weight Class data 457, tank capacity data 458, and range data 459, indicative of the distance an electric vehicle can drive on a fully charged battery. Manufacturer data 414 may include other vehicle specification and/or related data.

Data provided in manufacturer data depends on whether a vehicle has a combustion engine, is an electric vehicle, or a hybrid vehicle. For instance, manufacturer data for a vehicle having a combustion engine will not include range data. For example, manufacturer data 414 corresponds to a vehicle with a combustion engine, and thus range data 459 is unknown. In an instance wherein a vehicle is an electric vehicle, manufacturer data corresponding thereto will not include tank capacity data.

Shown in FIG. 4D is a conceptual diagram of first vehicle-related data 416, obtained by recommender system 310B for a vehicle associated with HWID 1651537948 and stored thereby, for example, in datastore 328. First vehicle-related data 416 comprises historical vehicle data 412 and manufacturer data 414, as shown.

Recommender system 310B obtains first vehicle-related data for each vehicle of the plurality of vehicles in historical vehicle data 330.

Now referring to FIG. 4E, shown is a conceptual diagram of first vehicle-related data 418 corresponding to each vehicle of the plurality of vehicles. Recommender system 310B may store first vehicle-related data 418, for example, in datastore 328.

Block 204

Next, at block 204, process 200 includes generating a plurality of features based on and/or derived from first vehicle-related data for each vehicle of the plurality of vehicles.

According to an embodiment, each of the plurality of features for each vehicle of the first plurality of vehicles includes categorical variables, e.g., labels. In some instances, generating a plurality of features associated with a vehicle includes converting discrete variables into categorical variables, e.g., binning. Generating categorical features enables creation of a high-dimensional space which is described in further detail below.

According to an embodiment of the invention, one or more features of the plurality of features generated for a vehicle is not based and/or derived from data that may identify a specific vehicle. Some specific and non-limiting examples of data that may identify a specific vehicle include data indicating one of a make, a model, year and/or VIN of a vehicle.

According to yet another embodiment of the invention, one or more features of the plurality of features generated for a vehicle is not based on and/or derived from data provided explicitly by one or more operators of that vehicle.

However, a plurality of features generated for a vehicle may be based on or derived from implicit information provided by one or more of the operators of the vehicle. In other words, a feature may be based on observed behaviours of one or more of the operators of a vehicle. Some examples of observed behaviours include, average speed of a vehicle, total time and/or distance a vehicle travels. However, it is unknown whether the observed behaviours are indicative of a single operator or multiple operators.

According to yet another embodiment of the invention, a plurality of features generated for a vehicle is not based on evaluation data associated therewith. Evaluation data will be described in further detail below.

Feature: Speed Profile

According to an embodiment, a feature of the plurality of features for a vehicle of the plurality of vehicles may be based on and/or derived from speed data provided in historical vehicle data associated with a corresponding vehicle. An exemplary feature includes a speed profile feature.

A speed profile feature is indicative of a ratio of total time travelled by a vehicle within a particular speed range, also referred to herein as a speed-time ratio.

In the present example, recommender system 310B divides a typical speed range of vehicles, such as 110 km/h, into a plurality of contiguous speed ranges. Alternatively, a speed range other than 100 km/hr is divided into a plurality of contiguous speed ranges. Shown in table 502 of FIG. 5A are exemplary speed ranges in Speed Range column 502A. Next, recommender system 310B assigns a label to each exemplary speed range in column 502A, as shown in SpeedRangeEncoded column 502B. For example, speed range 502-4A is defined as a speed greater than 20 km/hr and less than or equal to 30 km/r, and is assigned a label Ratio_30 502-4B, as shown.

In the present example, recommender system 310B processes historical vehicle data of each vehicle of the plurality of vehicles for determining a total time travelled by each thereof. For example, for a vehicle corresponding to HWID 1651537948, recommender system 310B may process speed data 433a, odometer data 439a, DateTime data 432a, and ignition state data 436a from a plurality of historical vehicle data instances 412 for determining total time travelled thereby. For instance, a total time travelled by a vehicle may be determined by summing the total time a vehicles ignition is on. In another instance, total time travelled for a vehicle may be determined by summing the total time a vehicles ignition is on while the vehicle speed is not 0 km/hr. Recommender system 310B generates total time data indicative of the total time travelled by each vehicle. Exemplary total time data 505 for each vehicle is shown in FIG. 504.

Next, a total time each vehicle has travelled within each speed range indicated in column 502A of FIG. 502 may be determined. For example, for the vehicle corresponding to HWID 1651537948, recommender system 310B may further process speed data 433a and DateTime data 432a for the determining the total time travelled by the vehicle within each speed range, and then generates speed range data (not shown) indicative thereof. Recommender system 310B determines the total time travelled by each vehicle within each speed range and generates speed range data indicative thereof.

Finally, for each vehicle of the plurality of vehicles, speed-time ratio data corresponding to each speed range is determined. For instance, for each vehicle, recommender system 310B processes speed range data corresponding to each speed range indicated in column 502A and total time data 505, for determining associated speed-time ratios. Recommender system 310B further associates each speed-time ratio, according to the speed range to which the speed-time ratio corresponds, to a SpeedRangeEncoded label in column 502B.

Shown in table 504 of FIG. 5B is exemplary speed-time ratio data 503 for each vehicle corresponding to each one of the SpeedRangeEncoded labels in column 502B. For example, row 504-1 indicates a vehicle associated with HWID 1651537948 has travelled a total time of 129 hours and has an approximate speed-time ratio of 0.462 corresponding to SpeedRangeEncoded label Ratio_80, as shown in cell 504-1L. For instance, the vehicle spent approximately 46.2% of its total travel time travelling at a speed faster than 70 km/hr and less than or equal to 80 km/hr.

In another example, row 504-1M indicates a millionth vehicle associated with HWID 1753287803 has travelled a total time of 543 hours and has an approximate speed-time ratio of 0.14 corresponding to SpeedRangeEncoded label Ratio_10, shown in cell 504-1ME. For instance, the vehicle spent approximately 1.4% of its total travel time travelling at a speed faster than 10 km/hr and less than or equal to 20 km/hr.

Next, recommender system 310B generates four features for each vehicle of the plurality of vehicles derived from speed-time ratio data 503, indicated in table 504. The four features include, Speed_Profile_1st, Speed_Profile_2nd, Speed Profile 3rd and Speed Profile 4th indicative of SpeedRangeEncoded labels corresponding to the four highest speed-time ratios. For example, feature Speed_Profile_1st indicates a label corresponding to the highest speed-time ratio for a vehicle and Speed Profile 4th indicates the label corresponding to the fourth highest time speed-time ratio for a vehicle.

Exemplary values of Speed_Profile_1st, Speed_Profile_2nd, Speed Profile 3rd and Speed Profile 4th features generated by recommender system 310B for each vehicle in the plurality of vehicles are shown in table 506 in FIG. 5C. For instance, features Speed_Profile_1st, Speed_Profile_2nd, Speed Profile 3rd and Speed Profile 4th for a vehicle associated with HWID 1651537948 have values, Ratio_80, Ratio_0, Ratio_90, and Ratio_70, respectively.

Alternatively, and/or additionally, recommender system 310B generates a single feature based on and/or derived from speed data for each vehicle of the plurality of vehicles.

Such as, Top Speed Profile indicating a SpeedRangeEncoded label corresponding to the highest speed-time ratio of a vehicle.

Alternatively, a speed profile feature may be generated as a ratio of total distance travelled by a vehicle within each of a plurality of speed ranges, such as exemplary speed ranges in Speed Range column 502A.

Alternatively, speed-time ratios are determined according to other speed ranges, other than those described above. For instance, speed ranges may be smaller/larger, e.g., each speed range values have less/more than a 10 km/hr spread. In another instance, a speed ranges may not equal in size, e.g., a portion of speed ranges have a 10 km/hr spread and another portion of speed ranges have a 5 km/hr spread. Embodiments are not limited to the example provided above.

Feature: Slow_Vehicle

According to an embodiment, another feature of the plurality of features for a vehicle of the plurality of vehicles based on and/or derived from speed data provided in historical vehicle data associated with a corresponding vehicle includes a Slow_Vehicle feature.

For instance, speed data provided in historical vehicle data for each vehicle of the plurality of vehicles is processed, and dependent on a vehicle meeting and/or exceeding a predetermined speed, the value of an associated Slow_Vehicle feature is assigned YES or NO.

For example, a predetermined speed is 100 km/h. Alternatively, the predetermined speed is other than 100 km/hr. Recommender system 310B processes speed data provided in historical vehicle data related to each vehicle of the plurality of vehicles, for determining whether a vehicle has met or exceeded 100 km/hr. Should recommender system 310B determine a vehicle has met or exceeded 100 km/hr, a Slow_Vehicle feature is generated having a NO value. However, should recommender system 310B determine a vehicle has not exceeded 100 km/hr, a Slow_Vehicle feature is generated having a YES value.

Shown in FIG. 6A is table 604 illustrating exemplary values of a Slow_Vehicle feature for each vehicle in the plurality of vehicles generated by recommender system 310B. For a vehicle associated with HWID 1651537948, recommender system 310B processes speed data 433a from a plurality of historical vehicle data 412 instances for determining whether that vehicle met or exceeded 100 km/hr. Speed data 412-1-433a in instance 412-1, indicates a speed of 100 km/h. Therefor Slow_Vehicle feature generated for a vehicle associated with HWID 1651537948 has a value of NO, as indicated in row 604-1.

In another example, Slow_Vehicle feature generated for a vehicle associated with HWID 1653381266 has a value of YES, as indicated in row 604-2.

Feature: Vehicle_Type

According to an embodiment, a feature of the plurality of features for a vehicle of the plurality of vehicles may be based on and/or derived from a vehicle type of a corresponding vehicle. An exemplary feature includes a Vehicle_Type feature.

Shown in FIG. 6B is list 606 of exemplary vehicle types. Recommender system 310B processes vehicle type data of manufacturer data associated with each vehicle of the plurality of vehicles and generates a Vehicle_Type feature indicative of vehicle type data. For example, vehicle type data 453 of manufacturing data 414 corresponding to a vehicle associated with HWID 16531537948 indicates the vehicle type thereof is a truck. As such, recommender system 310B generates a Vehicle_Type feature for the vehicle associated with HWID 16531537948 having a value of Truck.

Table 608 of FIG. 6C illustrates exemplary values of Vehicle_Type features generated by recommender system 310B for each vehicle of the plurality of vehicles. For instance, row 608-1 indicates that the Vehicle_Type feature for the vehicle associated with HWID 16531537948 has a value of Truck.

Feature: Triphoursencoded

According to an embodiment, a feature of the plurality of features for a vehicle of the plurality of vehicles may be based on and/or derived from a total amount of time a corresponding vehicle has travelled. An exemplary feature includes a TripHrsEncoded feature.

For example, recommender system 310B divides a time range, for example 470 hours, into a plurality of contiguous time ranges, such as exemplary time ranges shown in Total Time Travelled Range column 610-A in table 610 of FIG. 6D. Next, recommender system 310B assigns a label to each time range in column 610-A, as shown in TripHrsLabel column 610-B. For instance, a total time travelled range 610-3A is defined as a time greater than 30 hours and less than or equal to 60 hours and is assigned label Trip_hrs_60 610-3B, as shown.

In the present example, recommender system 310B processes historical vehicle data of each vehicle of the plurality of vehicles for determining a total time travelled by each thereof. For example, for a vehicle corresponding to HWID 1651537948, recommender system 310B may process speed data 433a, odometer data 439a, DateTime data 432a, and ignition state data 436a from a plurality of historical vehicle data instances 412 for determining total time travelled thereby. For instance, a total time travelled by a vehicle may be determined by summing the total time a vehicles ignition is on. In another instance, total time travelled for a vehicle may be determined by summing the total time a vehicles ignition is on while the vehicle speed is not 0 km/hr. Recommender system 310B generates time data (not shown) indicative of the total time travelled by each vehicle.

Next, recommender system 310B processes time data associated with each vehicle for determining which Total Time Travelled Range defined in 610-A the time data corresponds and generates a TripHrsEncoded feature having a value of a TripHrsLabel label associated therewith.

Table 612 in FIG. 6E shows exemplary TripHrsEncoded features generated by recommender system 310B for each vehicle of the plurality of vehicles. For example, a TripHrsEncoded feature having a value of Trip_hrs_210 is generated for a vehicle associated with HWID 1650969255, as shown in row 612-3 of table 612.

Feature: Displacement Encoded

According to an embodiment, a feature of the plurality of features for a vehicle of the plurality of vehicles may be based on and/or derived from a vehicles engine displacement. An exemplary feature includes a Displacement_Encoded feature.

For example, recommender system 310B divides a range of typical vehicle engine displacement values for vehicles, into a plurality of contiguous displacement ranges. In the present example, a range of typical vehicle engine displacement values for vehicles includes 1 L to 15 L. For example, Table 614 in FIG. 6F illustrates exemplary displacement ranges in Displacement Range column 614-A.

Next, recommender system 310B assigns each displacement range in column 614-A a label, as shown in Displacement Label column 614-B. For instance, displacement range 614-2A is defined as a displacement greater than or equal to 5 and less than 7 and is assigned label Displacement_9 614-3B.

In the present example, recommender system 310B processes displacement data of manufacturer data for each vehicle of the plurality of vehicles for determining an engine displacement thereof. For example, displacement data 351 of manufacturing data 614 for a vehicle corresponding to HWID 1651537948 is indicative of a displacement of 5.7 L.

Next, for each vehicle, recommender system 310B determines within which Displacement Range of column 614-A the displacement of a vehicle corresponds as well as the associated Displacement Label of column 614-B. Next, recommender system 310B generates a Displacement_Encoded feature having a value of a Displacement Label corresponding thereto.

Table 616 in FIG. 6G shows exemplary Displacement_Encoded features generated by recommender system 310B for each vehicle of the plurality of vehicles. For example, a Displacement_Encoded feature having a value of Displacement_13 is generated for a vehicle associated with HWID 1650969255, as shown in row 616-4 of table 616.

In the above example, a range of typical vehicle engine displacement values for vehicles and displacement ranges are described for descriptive purposes only. In practise, however, a range of typical vehicle engine displacement values for vehicles may include another range. Furthermore, a range of typical vehicle engine displacement values for vehicles may be divided in another manner resulting in other contiguous displacement ranges. Embodiments are not limited to the examples provided herein.

Feature: HP_Encoded

According to an embodiment, a feature of the plurality of features for a vehicle of the plurality of vehicles may be based on and/or derived from a vehicles engine horsepower. As exemplary feature includes a HP_Encoded feature.

For example, recommender system 310B divides a range of typical vehicle engine horsepower values of vehicles into a plurality of contiguous horsepower ranges. In the present example, a range of typical vehicle engine horsepower values includes 100 hp to 450 hp and above. For example, table 702 of FIG. 7A illustrates exemplary horsepower ranges in HP_Range column 702-A.

Next, recommender system 310B assigns each horsepower range in column 702-A a label, as shown in HP_RangeLabel column 702-B. For example, horsepower range in 702-5A defined as a horsepower greater than 300 and less than or equal to 350 is assigned label HP_350 702-5B, as shown.

In the present example, recommender system 310B processes horsepower data of manufacturer data for each vehicle of the plurality of vehicles for determining an engine horsepower thereof. For example, displacement data 451 of manufacturing data 414 for a vehicle corresponding to HWID 1651537948 is indicative of a horsepower of 370.

Next, for each vehicle, recommender system 310B determines within which HP Range the vehicle engine horsepower falls and generates a HP_Encoded feature having a value of a HP_RangeLabel label corresponding thereto.

Table 704 in FIG. 7B shows exemplary HP_Encoded features generated by recommender system 310B for each vehicle of the plurality of vehicles. For example, a HP_Encoded feature for a vehicle associated with HWID 1650969255 has a value of HP_250, as shown in row 704-3.

In the above example, a range of typical horsepower values for vehicles and horsepower ranges are described for descriptive purposes only. In practise, however, a range of typical vehicle horsepower values for vehicles may include another range. Furthermore, a range of typical horsepower values for vehicles may be divided in another manner resulting in other contiguous horsepower ranges. Embodiments are not limited to the examples provided herein.

Feature: Weightclassadj

According to an embodiment, a feature of the plurality of features for a vehicle of the plurality of vehicles may be based on and/or derived from a weight class of a vehicle. An exemplary feature includes a WeightClassADJ (weight class adjusted) feature.

Shown in FIG. 8A is list 802 of exemplary weight classes of vehicles. As discussed hereinabove, a weight class data for a vehicle may be provided in associated manufacturer data In an instance wherein a weight class of a vehicle is known, e.g., weight class data is available in manufacturers data, a value of a WeightClassADJ feature includes the value of weight class data. However, if a weight class of a vehicle is unknown, e.g., weight class data is not available in manufacturers data, a value of a WeightClassADJ feature is dependent on the vehicle type of the vehicle.

Figure 8B:
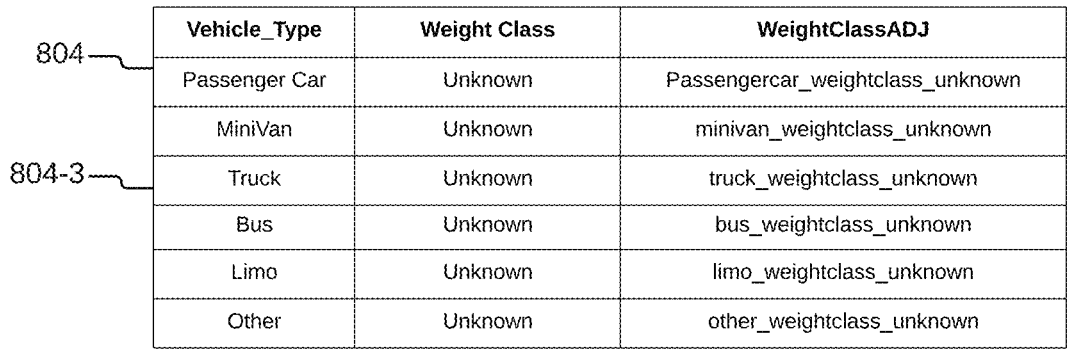
FIG. 8B shows exemplary values of a WeightClass_ADJ feature for various vehicle types having an unknown weight class.

Referring now to FIG. 8B, shown is table 804 including exemplary values of a WeightClass_ADJ feature for various vehicle types and when weight class data for the vehicle is unknown. For example, row 804-3 indicates that a WeightClass_ADJ feature for a vehicle having a vehicle type Truck and an unknown weight class, includes value truck_weightclass_unknown.

Figure 8C:
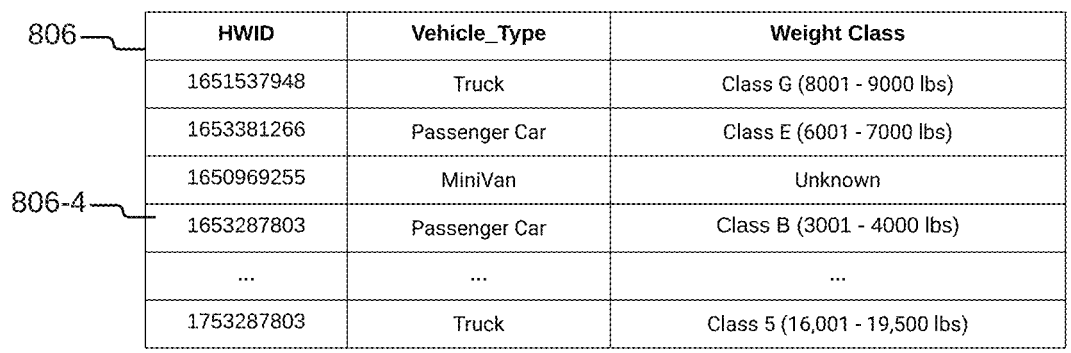
FIG. 8C shows HWIDs and exemplary vehicle types and weight classes of vehicles associated with each HWID.

Table 806 of FIG. 8C shows HWIDs and exemplary vehicle types and weight classes of each vehicle of the plurality of vehicles based on vehicle type data and Weight Class data provided in manufacturing data associated with the HWID. For example, a vehicle associated with HWID 1653287803 has a Passenger Car vehicle type and a Class B (3001-4000 lbs) weight class, as shown in row 806-4.

In the present example, for each vehicle of the plurality of vehicles, recommender system 310B processes vehicle type data and weight class data of manufacturing data associated therewith and generates a WeightClass_ADJ feature based thereon.

Figure 8D:
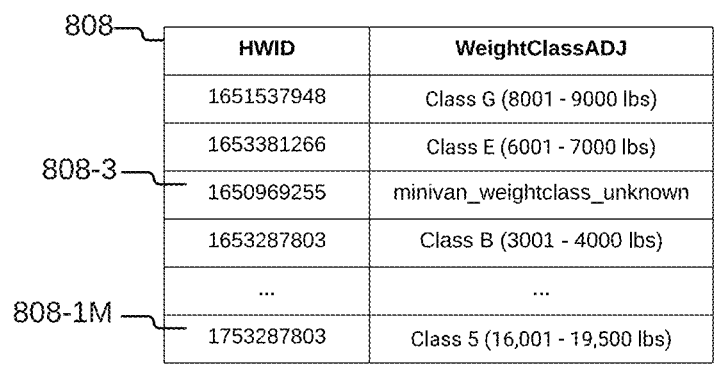
FIG. 8D shows exemplary values of WeightClass_ADJ features generated by a recommender system.

Table 808 of FIG. 8D shows exemplary values of WeightClass_ADJ features generated by recommender system 310B for each of the plurality of vehicles.

In a first example, recommender system 310B processes vehicle type data indicating MiniVan vehicle type and weight class data indicating unknown for a vehicle associated with HWID 1650969255. Recommender system 310B then generates a WeightClass_ADJ feature having a value of minivan_weightclass_unknown, as shown in row 808-3.

In another example, recommender system 310B processes vehicle type data indicating Truck vehicle type and weight class data indicating Class 5 (16,001-19,500 lbs), for a vehicle associated with HWID 1650969255. Recommender system 310B then generates a WeightClass_ADJ feature having a value of class Class 5 (16,001-19,500 lbs), as shown in row 808-1M.

Feature: Geo_Significant

According to an embodiment, a feature of the plurality of features for a vehicle of the plurality of vehicles may be based on and/or derived from a cell of a geospatial indexing system visited by the vehicle. An exemplary feature includes a Geo_significant feature.

A Geo_significant feature may be generated by processing historical vehicle data associated with a vehicle for determining a cell of a geospatial indexing system that has been visited the most by the vehicle, compared to other cells.

In the present example, recommender system 310B processes historical vehicle data associated with each vehicle of the plurality of vehicles for determining GPS positions visited thereby. Next, recommender system 310B associates each GPS position with a cell of geospatial indexing system, such as a geohash of precision 2, of the geohash geospatial indexing system. A person of skill will appreciate methods for mapping a GPS point to a geohash. Finally, recommender system 310B determines a geohash of precision 2 associated with the most GPS positions for each vehicle.

Figure 9A:
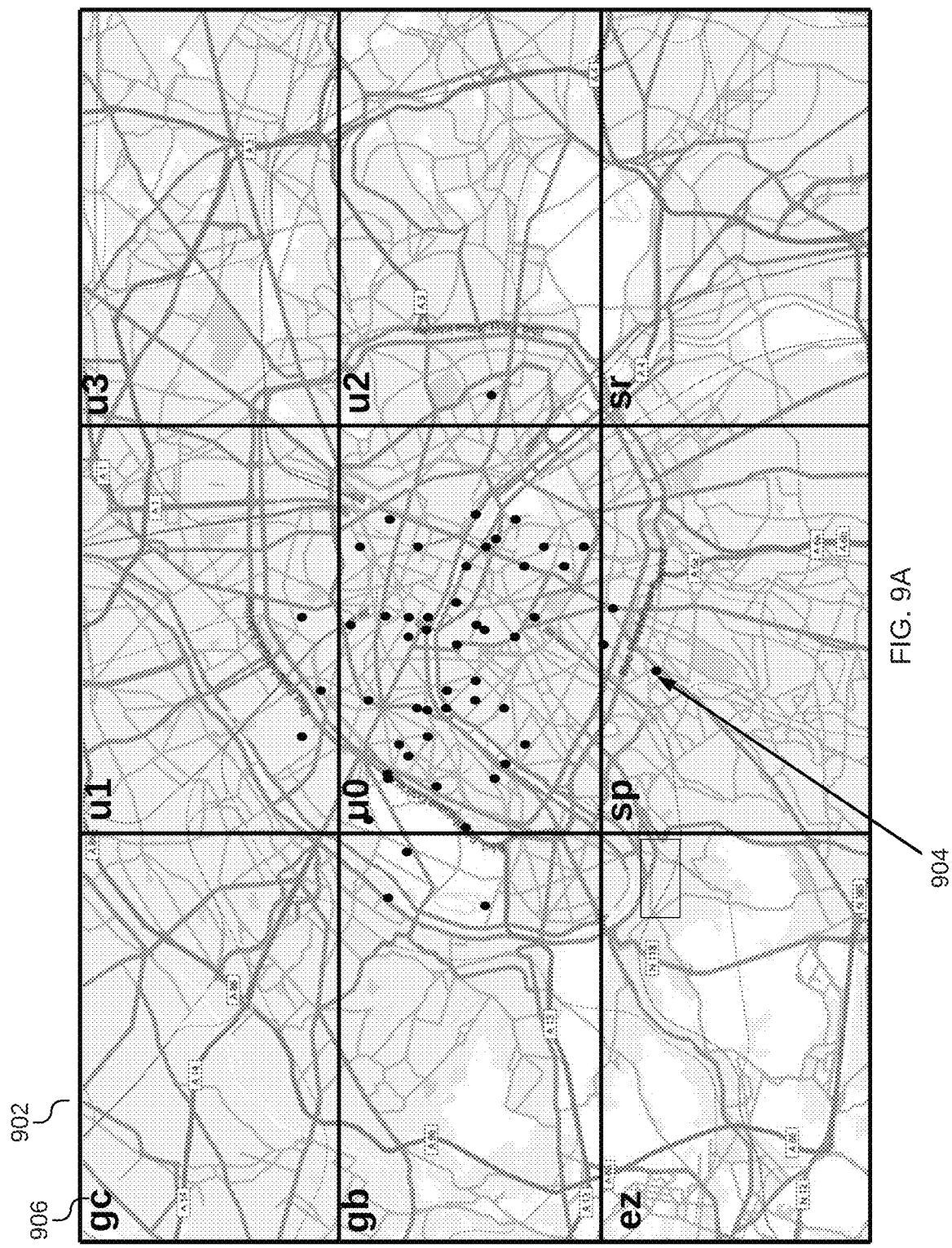
FIG. 9A illustrates is a simplified map illustrating GPS positions of a vehicle.

Shown in FIG. 9A is a simplified map 902 illustrating GPS positions of a vehicle associated with HWID 1651537948. Map 902 includes points 904 indicating a GPS position visited by the vehicle. FIG. 9A also shows geohashes 906 of precision 2 overlaid on map 802. A geohash of precision 2 covers an area of approximately 1,250 km×625 km. In this example, points 904 are located in geohashes u1, gb, u0, u2, and sp, however, the majority of GPS points 904 are located in geohash u0. Thusly, a Geo2_significant feature for the vehicle associated with HWID 1651537948 will be generated with a value of u0.

Figure 9B:
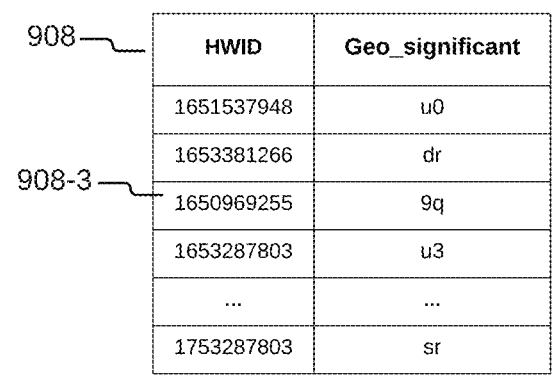
FIG. 9B shows exemplary Geo2_significant features generated by a recommender system.

FIG. 9B, table 908 shows exemplary Geo_significant features generated for each of the plurality of vehicles by recommender system 310B. For example, Geo_significant feature associated with HWID 1650969255 has a value of 9q, as shown in row 908-3.

Alternatively, GPS positions of a vehicle may be associated with a geohash of a precision other than 2.

Alternatively, a cell of another geospatial indexing system is associated with the most GPS positions for generating a Geo_significant feature. A specific and non-limiting example includes, a cell in the form of a hexagon, of the hexagonal hierarchical geospatial indexing system H3.

Optionally, process 200 includes preparing features which may include various functions such as removing outliers (e.g., unlikely speed values), duplicate values, and the like.

Derived features may be based on a of raw vehicle data instance or subset of raw vehicle data instances, but include a value not found therein. Instead, a value of a derived feature may be derived from the instance or subset, such as obtained through performing one or more computations on the instance or subset. Specific and non-limiting examples of derived features include average speed and total time travelled by a vehicle. Optionally, a derived feature may describe a first derived feature forming a second derivative of the first derived feature. Additional derivatives of features may also be possible.

The features may additionally or alternatively be derived from the performance of one or more statistical computations on a subset of raw vehicle data. For instance, a derived feature that may be employed may include standard deviation, mean, and median of values found in a subset of raw vehicle data.

Additionally, and/or alternatively, features may be derived from outputs of a trained machine learning (ML) model that categorizes and/or predicts patterns found in historical vehicle data of the plurality of vehicles. For example, first features may be derived from the historical vehicle data of the plurality of vehicles and processed by a trained ML model for categorizing and/or predicting a vehicles usage pattern. The category and/or prediction of a vehicles usage pattern may then be used to derive a feature of the plurality of features for each of the plurality of vehicles.

According to an embodiment, generating a high-dimensional vector based on the plurality of features associated with a vehicle includes encoding each of the plurality of features according to a one hot encoding technique. One-hot encoding converts categorical data into integer data, e.g., binary format. This technique also creates additional features based on the number of unique values in the categorical feature. For instance, every unique value in a category will be added as a feature.

For example, Vehicle_Type feature is a categorical feature. As discussed hereinabove, a Vehicle_Type feature has 6 unique values including, Passenger Car, MiniVan, Truck, other, Bus and Limo, as shown in list 606 of FIG. 6B. One-hot encoding a Vehicle_Type feature results in a high-dimensional vector including 6 binary numbers.

For example, table 1010 of FIG. 10A illustrated HWIDs associated with four vehicles shown in row 1010-1 and exemplary Vehicle Type features associated therewith in row 1010-2. For instance, a vehicle associated with HWID 1651537948 has a Vehicle_Type feature value of Truck, as shown in column 1012A.

One-hot encoding each feature in row 1010-2 produces high-dimensional vectors, as shown in columns of table 1014 of FIG. 10B. For example, referring to column 1010A, a Vehicle_Type feature having a value of Truck for a vehicle associated with HWID 1651537948 has been transformed into 6 features having a binary value, as shown in column 1014A. For instance, the high-dimensional vector corresponding to the vehicle associated with HWID 1651537948 includes [0,0, 1,0, 0, 0].

Block 206

Next, at block 206, process 200 includes generating a high-dimensional vector (e.g., a high-dimensional space) for each vehicle of the plurality of vehicles based on the plurality of features generated for each thereof.

Figure 10C:
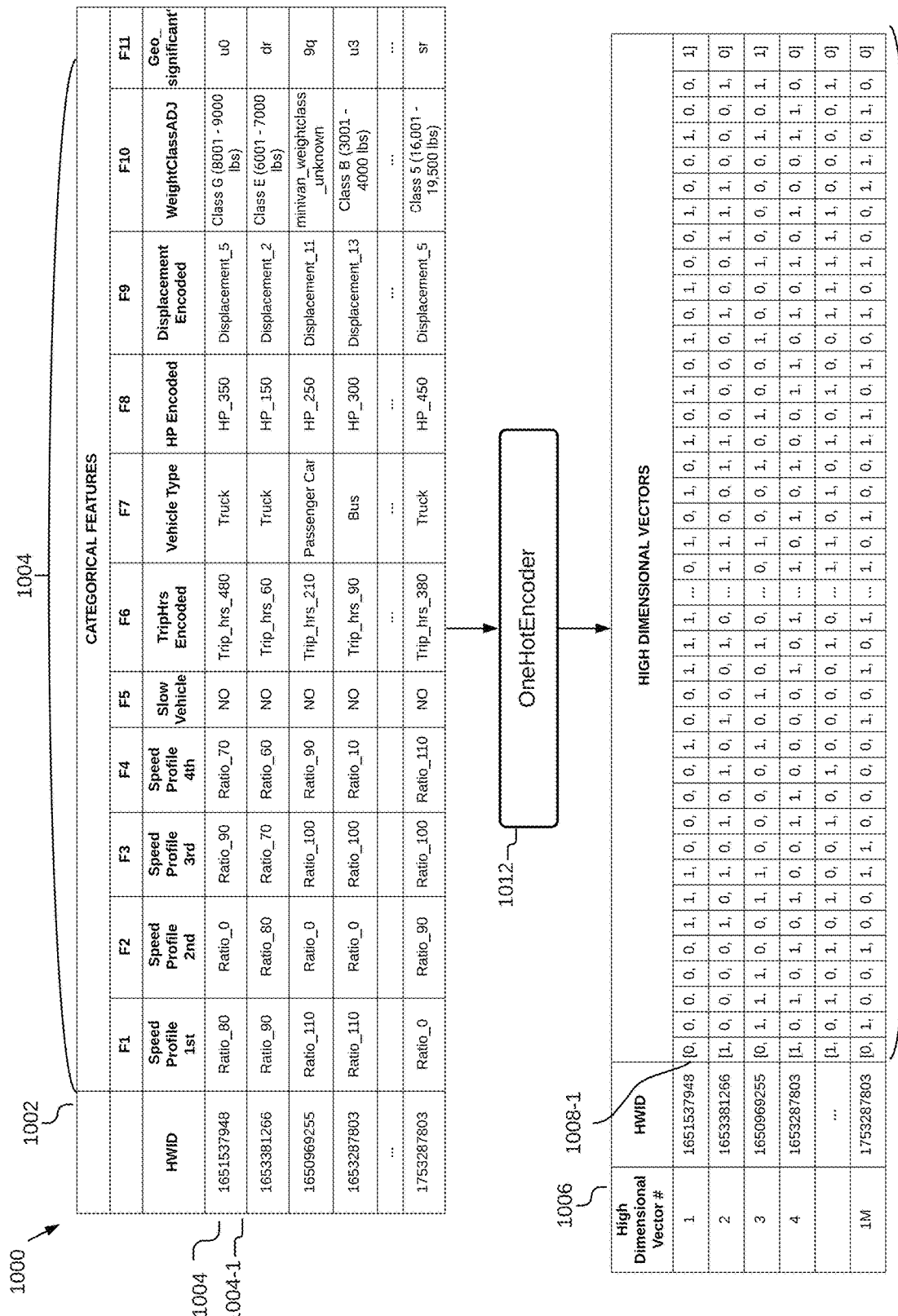
FIG. 10C is a conceptual block diagram of an exemplary method for transforming a plurality of categorical features into high-dimensional vectors.

Shown in FIG. 10C, is a conceptual block diagram 1000 of an exemplary method for transforming a plurality of categorical features into high-dimensional vectors wherein transforming includes one-hot encoding each thereof into high-dimensional vectors.

Block diagram 1000 includes table 1002 illustrating exemplary feature vectors 1004, associated with each vehicle of the plurality of vehicles. Each feature vector 1004 includes 11 features, F1 to F11, as shown. For example, Features F1 to F11 includes a plurality of categorical features generated for each vehicle of the plurality of vehicles as discussed hereinabove.

At block 1012, exemplary feature vectors 1004 for each vehicle of the plurality of vehicles is one-hot For example, recommender 310B one hot encodes features 1004 and forms high-dimensional vectors 1008 as shown in table 1006.

For example, features F1 to F11 of feature vector 1004-1 corresponding to a vehicle associated with HWID 1651537948 is transformed into high-dimensional vector 1008-1, using a one-hot encoding technique. In this instance, exemplary feature vector 1004-1 has 11 features and is transformed into high-dimensional vector 1008-1 having, for example, 105 dimensions.

One-Hot Encoding prepares feature information to be understood by a machine learning model. For instance, strings are converted into numbers. Furthermore, one-hot encoding categorical features creates a high-dimensional space which may enable more relationships between categorical variables to emerge during training of a machine learning algorithm. Training of a machine learning algorithm is described in further detail below.

Block 208

Next, at block 208, process 200 includes performing dimensionality reduction for reducing the dimension of the high-dimensional vectors for forming low dimension encoded features.

According to an embodiment, dimensionality reduction may be performed by a machine learning model in the form of a neural network, such as, an autoencoder.

An autoencoder may be trained for identifying non-linear relationships between high-dimensional vectors, such as high-dimensional vectors 1008, and reducing the meaningful information therein down to a much smaller number of encoded features.

Figure 11A:
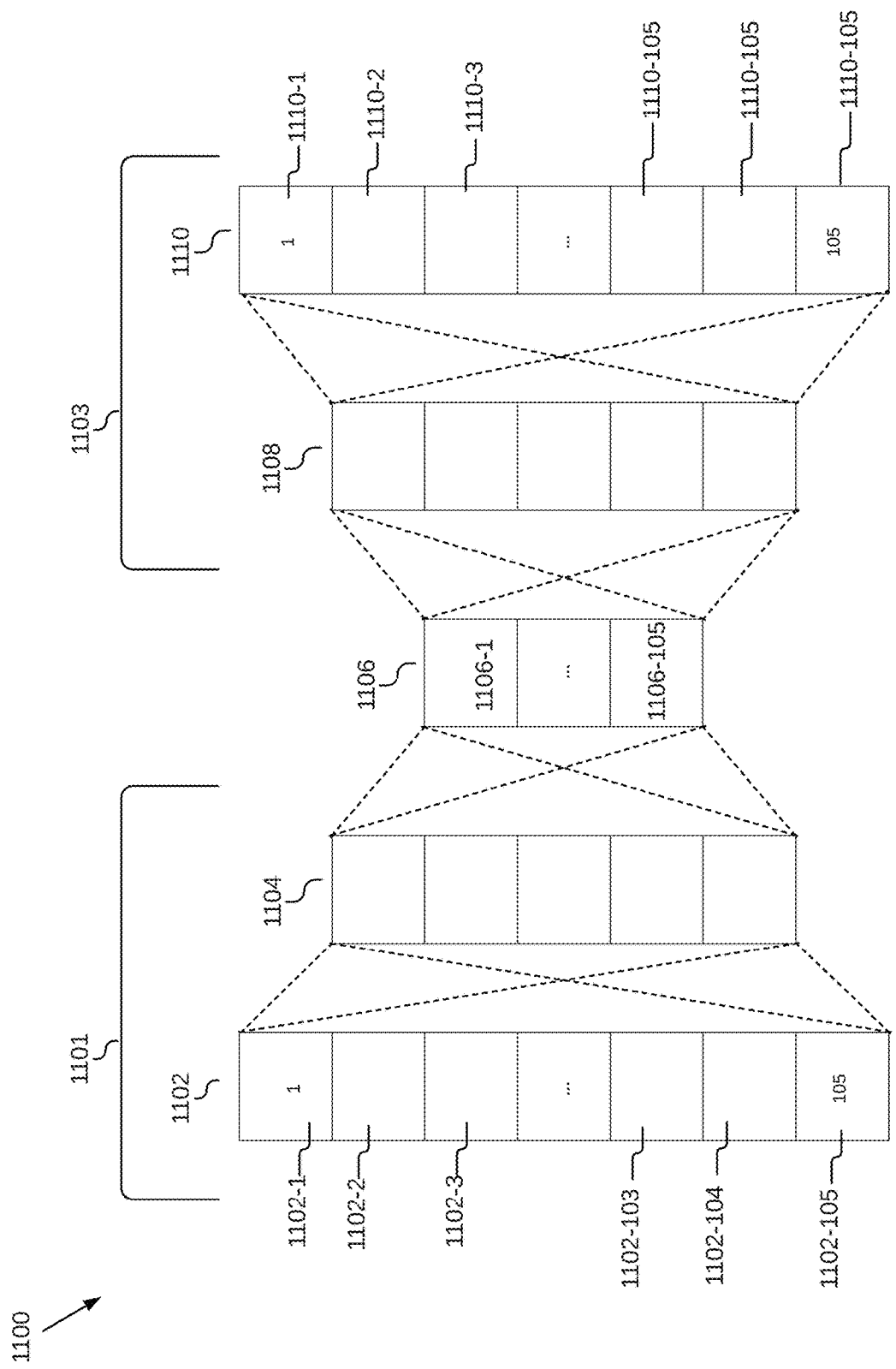
FIG. 11A is a simplified block diagram of an exemplary autoencoder.

Shown in FIG. 11A is a simplified block diagram of an exemplary autoencoder 1100. An autoencoder comprises an encoder, such as encoder 1101, a decoder 1103, and an embedding layer, such as embedding layer 1106.

An encoder, such as encoder 1101 comprises visible node layer, such as visible node layer 1102, having visible nodes for receiving input. For example, visible nodes 1102-1 to 1102-105 of visible node layer 1102 receives input. An encoder also includes one or more hidden layers, such as hidden layer 1104.

Input received by visible nodes of an encoder is mapped thereby into a code, also referred to herein as an embedding. Neural network/autoencoder embeddings are low-dimensional, learned, continuous vector representations, (i.e., encoded features) of discrete variables, (e.g., binary numbers). In the present example, encoded features are provided at the embedding layer, such as embedding layer 106.

A decoder, such as decoder 1103, comprises one or more hidden layers, such as hidden layer 1108, and visible node layer, such as visible node layer 1110 for providing output. For example, visible nodes 1110-1 to 1110-105 of visible node layer 1110 provides output.

Encoded features provided at the embedding layer is mapped by the decoder to a reconstruction of the original input. The original input, for example, is the input received at visible node layer of the encoder. In other words, an autoencoder can be trained to copy its input to its output.

Prior to training a neural network/autoencoder, hyperparameters, e.g., variables, that determine the network structure (e.g., number of hidden units) and how the network is trained (e.g., learning rate) are selected. Some specific and non-limiting examples of hyperparameters include, number of hidden layers, number of nodes per hidden layer, regularization parameter, dropout parameter and learning rate.

Hyperparameters are well known and a persons of skill in the art will appreciate that hyperparameters are uniquely tuned for each neural network/autoencoder.

In the present example, recommender 310B may select hyperparameters for autoencoder 1100. Next, recommender 310B provides high-dimensional vectors 1008, each having 105 dimensions, to visible nodes 1102 of encoder 1101. In this example, encoder 1101 maps each high-dimensional vector 1008 to 12 encoded features, e.g., an encoded vector, at embedding layer 1106. Recommender 310B may store encoded vectors, for example, in a local datastore 328. Exemplary embedded vectors 1112 provided at embedding layer 1106 are shown in FIG. 11B. Next, decoder 1110 maps each embedded vector 1112 to a reconstruction of the original input, provided at visible nodes 1110.

Referring again to FIG. 11B, each embedded vector 1112, includes 12 encoded features 1112, EF1 to EF12. Recommender 310B stores an embedded vector 1112 provided at embedding layer 1106 corresponding to each high-dimensional vector 1008 input into encoder 1101. Thus, each embedded vector 1112 corresponds to a same vehicle as a corresponding high-dimensional vector 1008.

For example, high-dimensional vector 1008-1 corresponds to a vehicle associated with a monitoring device having a HWID 1651537948. Encoded vector 1112-1 corresponds to high-dimensional vector 1008-1. Therefore, encoded vector 1112-1 corresponds to a vehicle associated with a monitoring device having a HWID 1651537948, as shown in FIG. 11B.

In the present example, autoencoder 1100 encodes a high-dimensional vector 1008 having 105 dimensions to an encoded vector 1112 having only 12 dimensions. Each encoded vector 112 is a learned, continuous vector representation of a corresponding high-dimensional vector 1008 comprising discrete numbers, as shown in FIG. 11B.

The example above describes an autoencoder having a structure that includes an encoder having 105 visible nodes and one internal layer, an embedding layer comprising 12 nodes, and a decoder having 105 visible nodes and one internal layer. However, the structure of an autoencoder may differ from the example described above. For example, an encoder and/or decoder may have more than, or less than, 105 visible nodes and each may have more than one internal layer. Also, an embedding layer may include more than, or less than, 12 nodes. Embodiments should not be limited to embodiments described herein Alternatively, another machine learning technique is implemented to perform dimensionality reduction. Specific and non-limiting examples include Generalized Discriminant Analysis, Independent Component Analysis and Linear Discriminant Analysis.

Further alternatively, another technique is implemented to perform dimensionality reduction. For example, principal component analysis (PCA), t-distributed stochastic neighbor (t-SNE) or another dimensionality reduction technique.

Block 210

Next at block 210, process 200 includes validating the output of the machine learning model. Validating includes measuring the quality of the output provided by the machine learning model.

Measuring the quality of the output of an autoencoder may include generating evaluation metrics indicating an error between input provided to the autoencoder and output therefrom. Specific and non-limiting examples of evaluation metrics include, accuracy, mean squared error, and reconstruction error. If evaluation metrics are determined to be within acceptable parameters, process 200 proceeds to block 212, other wise process 200 proceeds to 208.

In the present example, recommender 310B stores output provided at visible layer 1110 of decoder 1103 corresponding to each of high-dimensional vectors 1008. Next, recommender 310B processes high-dimensional vectors 1008 and corresponding output for generating evaluation metrics indicating an error between high-dimensional vectors 1008 and corresponding output. For example, recommender 310B generates evaluation metrics in the form of one or more of, accuracy, mean squared error, and reconstruction error, corresponding to high-dimensional vectors 1008 and corresponding output.

Alternatively, recommender 310B stores output provided at visible layer 1110 of decoder 1103 corresponding to a first portion of high-dimensional vectors 1008, for example, 2000 out of the 1 million high-dimensional vectors 1008. Next, recommender 310B processes the first portion of high-dimensional vectors 1008 and corresponding output for generating evaluation metrics indicating an error between the first portion of high-dimensional vectors 1008 and corresponding output. For example, recommender 310B generates evaluation metrics in the form of one or more of, accuracy, mean squared error, and reconstruction error, corresponding to the first portion of high-dimensional vectors 1008 and corresponding output.

A specific and non-limiting example of an evaluation metric within acceptable parameters includes an accuracy greater than 97%. In the present example, recommender 310B generates the accuracy of the output of autoencoder 1100 to be 98%, which is greater than 97%, and thus within is acceptable parameters. As such, process 200 proceeds to block 212.

Evaluation metrics that are not within acceptable parameters, indicates that the machine learning model requires an adjustment. For example, recommender 310B generates the accuracy of the output of autoencoder 1100 to be 40%, which is less than 97%, and thus is not within acceptable parameters. To improve accuracy of the output process 200 proceeds to one of blocks 204 and 208.

Persons skilled in the art appreciate the various techniques implemented for measuring the quality of output provided by a machine learning model and acceptable values of the evaluation metrics for indicating the quality of the output thereby.

At block 204, the present plurality of features based on and/or derived from first vehicle-related data are modified. For example, recommender 310 may add one or more new features to, and/or remove one or more features from, the present plurality of features.

At block 208, hyperparameters of the machine learning model are modified/tuned prior to reducing the dimensions of high-dimensional vectors. For example, recommender 310B modifies hyperparameters of autoencoder 1110. Specific and non-limiting examples of hyperparameters that may be modified by recommender 310B include, number of hidden layers, number of nodes per hidden layer, regularization parameter, dropout parameter and learning rate. Hyperparameters are well known and a persons of skill in the art will appreciate that hyperparameters are uniquely tuned for each neural network/autoencoder.

For each loop of one of blocks 208 and 210 and blocks 204, 206, 208 and 210, nodes within a machine learning model/neural network/autoencoder may be updated/modified. Furthermore, encoded vectors of each embedding are also updated. Training and validation of the machine learning model continues until evaluation metrics are within acceptable parameters.

Alternatively, other techniques for measuring the quality of the output of the autoencoder are implemented.

Block 212

At block 212, process 200 comprises determining a similarity score between a first vehicle of the first plurality of vehicles and each vehicle of the first plurality of vehicles.

According to an embodiment, determining a similarity score between a first vehicle of the first plurality of vehicles and each vehicle of the first plurality of vehicles includes determining a relative distance between encoded vectors associated with the first vehicle and each thereof according to a distance function. An output of the distance function may be considered a similarity score. A small similarity score indicates two vehicles are quite similar, whereas, a large similarity score indicates two vehicles are less similar.

For example, a distance function in the form of cosine is implemented by recommender system 310B for determining a relative distance between encoded features associated with the first vehicle and encoded features associated with each vehicle of the first plurality of vehicles. Alternatively, another distance function is implemented, for example, one of Euclidean, Seuclidean and Minkowski distance functions.

Relative distances between a plurality encoded features associated with a first vehicle of the plurality of vehicles and encoded features associated with each of the first plurality of vehicles provides an indication of which of the first plurality of vehicles are most similar to the first vehicle.

Figure 12A:
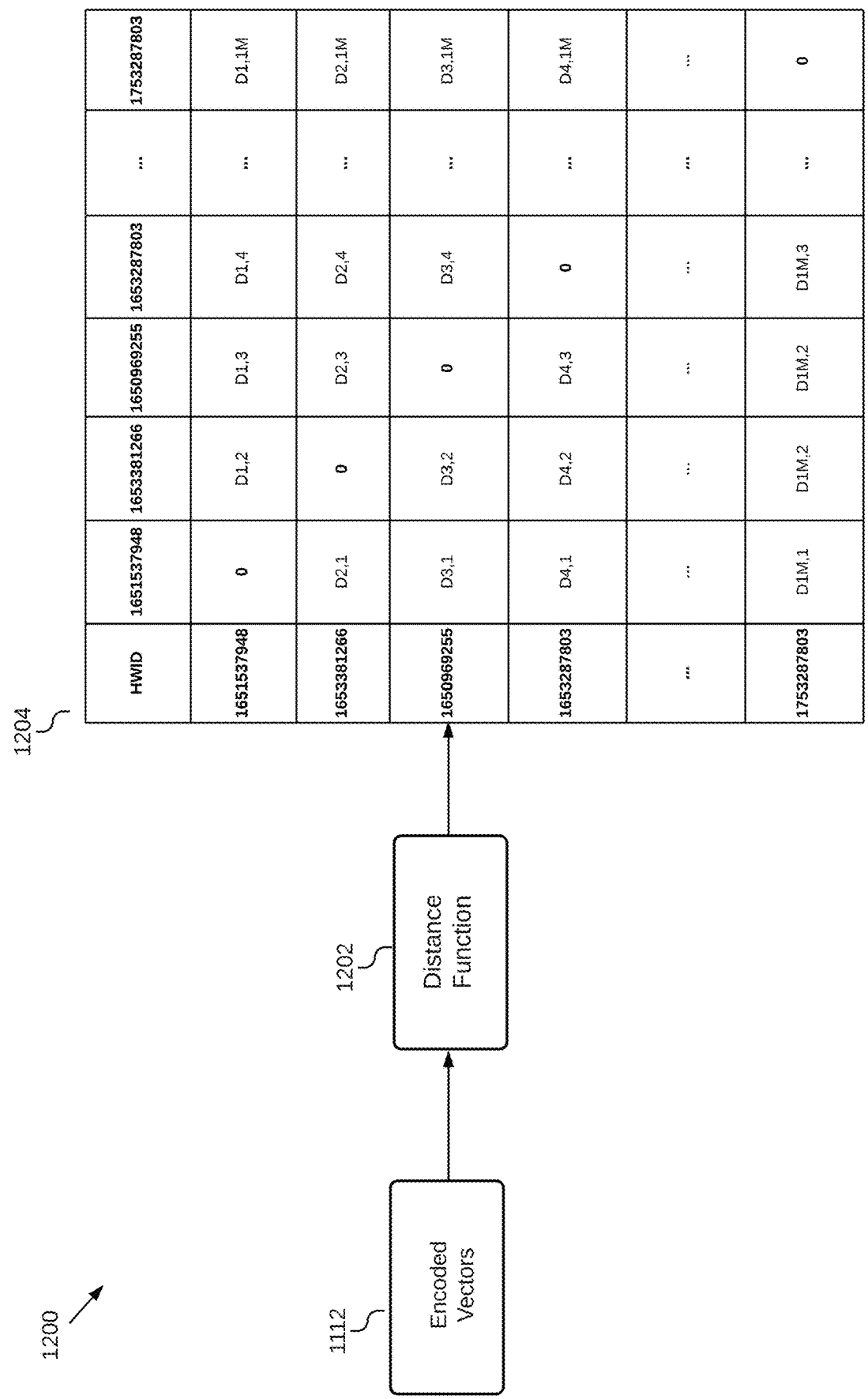
FIG. 12A is a conceptual block diagram of an exemplary method for determining a similarity score of two vehicles.

Shown in FIG. 12A is a conceptual block diagram 1200 of an exemplary method implemented by recommender 310B for determining a similarity score of two vehicles in the plurality of vehicles. For example, recommender 310B processes encoded features 1112 of each possible pair of vehicles in the plurality of vehicles by distance function 1202. Matrix 1204 shows exemplary relative distances, i.e., similarity scores, determined by recommender 310B for each possible pair of vehicles.

For example, a similarity score (i.e., relative distance between encoded features) corresponding to an exemplary first vehicle associated with HWID 1653287803 and a vehicle of the first plurality of vehicles associated with HWID 1653381266 is represented by D2,4. In another example, a similarity score (i.e., relative distance between encoded features) corresponding to the exemplary first vehicle associated with HWID 1651537948 and a vehicle of the first plurality of vehicles associated with HWID 1753287803 is represented by D1,1M, (i.e., D1,1,000,000.) Vehicles associated with a same HWID have a similarity score of 0 as they are one and the same vehicle.

Block 214

Next, in block 214, process 200 selects a subset of n-vehicles from the first plurality of vehicles for forming a second plurality of vehicles. The second plurality of vehicles are most similar to the first vehicle of the first plurality of vehicles based on relative distance between encoded features corresponding thereto.

In the present example, for each vehicle of the first plurality of vehicles, recommender system 310B selects n vehicles that are most similar thereto. In a first example, recommender 310B selects n=10 vehicles from the first plurality of vehicles most similar to a first vehicle associated with HWID 1651537948. Recommender 310B processes matrix 1204 and selects 10 vehicles from the first plurality of vehicles having the lowest similarity scores with another first vehicle associated with HWID 1651537948. Table 1200 of FIG. 12B, illustrates HWIDs associated with the 10 most similar vehicles to a first vehicle associated with HWID 1651537948 in column 1206-A.

In this example, encoded vectors corresponding to the vehicles associated with HWIDs in column 1206-A had the smallest relative distance between the encoded vector associated with HWID 1651537948 amongst the 1 million encoded vectors 1112.

Recommender system 310B determines 10 vehicles most similar to each vehicle in the first plurality of vehicles in a same manner as described above, as shown in table 1206. HWIDs in each column of table 1206 are not organized any particular order.

The second plurality of vehicles described in the example above includes 10 vehicles for descriptive purposes only. In practise, n may be hundreds, thousands, or more vehicles.

Next, process 200 may proceed to one of block 215 or block 216.

Block 215

At block 215, process 200 includes providing descriptive data indicating a make, model, and year of each vehicle in the subset of n-vehicles.

For example, a first vehicle associated with HWID 1651537948 is a vehicle in a first vehicle fleet managed by a first fleet manager. In this example, recommender 310 provides descriptive data indicative of the 10 vehicles most similar to this vehicle amongst the first plurality of vehicles which includes 1 million vehicles. In this instance, the second plurality of vehicles corresponds to vehicles associated with HWIDs in column 1206-A. Shown in FIG. 12C is a conceptual diagram of descriptive data provided to the first fleet manager indicating the 10 vehicles most similar to the first vehicle associated with HWID 1651537948.

Block 216

At the next block 216, process 200 includes ranking each vehicle in the second plurality of vehicles according to evaluation data associated with each thereof.

For instance, evaluation data may be in the form of fuel efficiency data indicative of fuel efficiency of a vehicle.

Table 1302 of FIG. 13A shows exemplary fuel efficiency indicated by fuel efficiency data associated with each of the 10 vehicles most similar to the first vehicle associated with HWID 1651537948, as shown in column 1206-A of table 1206. Fuel efficiency data may be provided by, for example, a vehicle manufacturer or 3rd party. Optionally, fuel efficiency data is provided in manufacturer data associated with a vehicle.

In the present example, recommender system 310B processes fuel efficiency data of each of the 10 vehicles most similar to the vehicle associated with HWID 16515379481 and ranks the 10 vehicles from highest fuel efficiency to lowest fuel efficiency. Table 1304 of FIG. 13B illustrates a HWID associated with a vehicle and ranking position, as ranked by recommender 310B, of each of the 10 vehicles.

Alternatively, evaluation data may be indicative of another parameter associated with a vehicle. For example, evaluation data may include data indicating a vehicle safety rating, Environmental Protection Agency (EPA) rate (applicable to electric vehicles), or other evaluation data.

Block 218

Finally, at block 218, process 200 includes providing descriptive data indicating a make, model, year and ranking of each vehicle in the second plurality of vehicles. Optionally, descriptive data includes evaluation data.

For example, a first vehicle associated with HWID 1651537948 is a vehicle in a first vehicle fleet managed by a first fleet manager. In this example, recommender 310 provides descriptive data indicative of the 10 vehicles most similar to this vehicle amongst the plurality of vehicles, which, in this example, includes 1 million vehicles. In this instance, the second plurality of vehicles corresponds to vehicles associated with HWIDs in column 1206-A. Shown in FIG. 13C is a conceptual diagram of descriptive data provided to the first fleet manager indicating the 10 vehicles most similar to the vehicle associated with HWID 1651537948 and their ranking position according to fuel efficiency. Optionally, fuel efficiency data of the vehicle associated with HWID 1651537948 is also included in the description data. Optionally, fuel efficiency of each of the second plurality of vehicles is also included in description data 1306.

It should be understood that aspects are described herein with reference to certain illustrative embodiments. The illustrative embodiments described herein are not necessarily intended to show all aspects, but rather are used to describe a few illustrative embodiments. Thus, aspects described herein are not intended to be construed narrowly in view of the illustrative embodiments. In addition, it should be understood that certain features disclosed herein might be used alone or in any suitable combination with other features.

Technical Effects

Embodiments described herein provide one or more technical effects and improvements to a vehicle telematic system/fleet management system and underlying components thereof. For example, an ability to provide a recommendation of vehicles similar to a first vehicle without access to, or use of, explicit vehicle operator data, creation of vehicle operator profiles, and/or grouping of like operators or like vehicles; an ability to provide a recommendation of vehicles similar to a first vehicle based on vehicle operating information related to the usage of vehicles and not preferences and/or or behaviours of the vehicle operators; an ability to provide a recommendation of vehicles similar to a first vehicle based on vehicle telematic data.

It should be understood that aspects are described herein with reference to certain illustrative embodiments. The illustrative embodiments described herein are not necessarily intended to show all aspects, but rather are used to describe a few illustrative embodiments. Thus, aspects described herein are not intended to be construed narrowly in view of the illustrative embodiments. In addition, it should be understood that certain features disclosed herein might be used alone or in any suitable combination with other features.

What is claimed is:

1. A method for recommending a second plurality of vehicles similar to a first vehicle comprising:

for each vehicle of a first plurality of vehicles, generating a plurality of features, the plurality of features based on and/or derived from at least one of historical vehicle data and manufacturer data associated therewith;

using at least one machine learning technique for selecting the second plurality of vehicles from the first plurality of vehicles similar to the first vehicle by:
    generating a high-dimensional vector for each vehicle of the second plurality of vehicles based on the plurality of features generated for each thereof,
    providing the high-dimensional vector associated with each vehicle of the first plurality of vehicles to a machine learning model,
    forming by the machine learning model a plurality of low-dimensional encoded vectors, each associated with a vehicle of the first plurality of vehicles,
    processing the plurality of low-dimensional encoded vectors associated with the first vehicle and each vehicle of the first plurality of vehicles by a distance function for determining a relative distance therebetween, the relative distance therebetween indicative of a similarity score to the first vehicle, and
    selecting the second plurality of vehicles from the first plurality of vehicles based at least in part on the similarity score for each vehicle of the first plurality of vehicles; and
for each vehicle of the second plurality of vehicles, providing descriptive data indicative of at least a make, a model, and manufacture year thereof.

2. The method of claim 1 wherein historical vehicle data includes a plurality of raw vehicle data instances indicative of vehicle operation information collected over a period of time.

3. The method of claim 1 wherein manufacturer data includes data indicative of vehicle manufacturer specification information.

4. The method of claim 1 further comprising receiving historical data from one at least one of a datastore and data management system.

5. The method of claim 1 wherein generating a plurality of features for a vehicle of the first plurality of vehicles includes
    generating the plurality of features based on and/or derived from at least one of historical vehicle data and manufacturer data associated therewith, the at least one of historical vehicle data and the manufacturer data other than including data indicative of a make, model and/or year of the vehicle.

6. The method of claim 1 wherein each of the plurality of features includes categorical features.

7. The method of claim 1 wherein generating at least a first feature of the plurality of features for a vehicle of the first plurality of vehicles includes,
    defining a plurality of speed ranges and assigning a first label to each thereof;
    processing historical vehicle data for determining a speed-time ratio corresponding to each of the plurality of speed ranges, the speed-time ratio indicating a ratio of a total time travelled by the vehicle within a speed range of the plurality of speed ranges; and
    generating at least a first feature including a first label assigned to a speed range dependent on a speed-time ratio corresponding thereto.

8. The method of claim 7 wherein generating the at least a first feature including a first label assigned to a speed range dependent on a speed-time ratio corresponding thereto includes generating at least a first feature including a first label assigned to a speed range associated with a highest speed-time ratio.

9. The method of claim 7 wherein generating the at least a first feature of the plurality of features includes generating a Speed Profile $1^{st}$ feature, Speed Profile $2^{nd}$ feature, Speed Profile 3rd feature, and Speed Profile $4^{th}$ feature, indicative of a first label assigned to a speed range corresponding to a highest speed-time ratio, a first label assigned to a speed range corresponding to a second highest speed-time ratio, a first label assigned to a speed range corresponding to a third highest speed-time ratio, and a first label assigned to a speed range corresponding to a fourth highest speed-time ratio, respectively.

10. The method of claim 1 wherein generating at least a first feature of the plurality of features for a vehicle of the first plurality of vehicles includes,
    processing speed data of historical vehicle data for determining whether a vehicle has one of met and exceeded a predetermined speed; and
    generating the at least a first feature indicating whether the vehicle has one of met and exceeded a maximum speed.

11. The method of claim 1 wherein generating at least a first feature of the plurality of features for a vehicle of the first plurality of vehicles includes generating a first feature indicative of a vehicle type indicated in the manufacturer data associated with the vehicle.

12. The method of claim 1 wherein generating at least a first feature of the plurality of features for a vehicle of the first plurality of vehicles includes,
    defining a plurality of total time travelled ranges and assigning a second label to each thereof;
    processing historical vehicle data for determining a total time travelled by a vehicle; and
    generating the at least a first feature including a second label assigned to a total time travelled range corresponding to the total time travelled by the vehicle.

13. The method of claim 1 wherein generating at least a first feature of the plurality of features for a vehicle of the first plurality of vehicles includes,
    defining a plurality of displacement ranges and assigning a third label to each thereof;
    processing manufacturer data for determining a displacement associated with the vehicle; and
    generating the at least a first feature including a third label assigned to a displacement range corresponding to the displacement associated with the vehicle.

14. The method of claim 1 wherein generating at least at least a first feature of the plurality of features for a vehicle of the first plurality of vehicles includes,
    defining a plurality of horsepower ranges and assigning a fourth label to each thereof;
    processing manufacturer data for determining a horsepower of the vehicle; and
    generating the at least a first feature including a fourth label assigned to a horsepower range corresponding to the horsepower associated with the vehicle.

15. The method of claim 1 wherein generating at least at least a first feature of the plurality of features for a vehicle of the first plurality of vehicles includes,
    processing manufacturing data associated with the vehicle for determining whether weight class data indicates a weight class;
    dependent on the weight class data associated with the vehicle indicating a weight class, generating the at least a feature indicating the weight class; and
    dependent on the weight class data associated with the vehicle other than indicating a weight class, generating the at least a feature indicating an unknown weight class and vehicle type associated with the vehicle.

16. The method of claim 1 wherein generating at least a first feature of the plurality of features for a vehicle of the first plurality of vehicles includes,
- processing LAT data and LON data of historical vehicle data associated with the vehicle, each of the LAT data and LON data indicative of a GPS position;
- mapping each GPS position to a plurality of cells of a geospatial hierarchy indexing system;
- determining a first cell of the plurality of cells to which most GPS positions are mapped thereto; and
- generating the at least a first feature indicative of the first cell.

17. The method of claim 16 wherein geospatial hierarchy indexing system includes Geohash.

18. The method of claim 1 wherein generating a high-dimensional vector for each vehicle of the second plurality of vehicles based on the plurality of features generated for each thereof includes
- encoding the plurality of features associated with each vehicle of the plurality of vehicles using a one hot encoding technique for generating the high-dimensional vector.

19. The method according to claim 1 further including providing descriptive data indicative of at least a make, model and year of each vehicle in the second plurality of vehicles.

20. The method of claim 1 further including ranking each vehicle of the second plurality of vehicles according to evaluation data associated therewith.

21. The method of claim 20 wherein descriptive data further includes an indication of the ranking of each vehicle in the second plurality of vehicles.

22. The method of claim 20 wherein evaluation data includes data indicative of one of vehicle fuel efficiency and vehicle safety.

23. The method of claim 1 wherein the distance function includes one of cosine, Euclidean, Seuclidean and Minkowski.

24. The method of claim 1 wherein the machine learning model comprises a neural network.

25. The method of claim 24 wherein the neural network includes an autoencoder.

26. The method of claim 1 wherein the machine learning model comprises at least one of a generalized discriminant analysis, an independent component analysis, and a linear discriminant analysis.

27. The method of claim 1 wherein selecting the second plurality of vehicles from the first plurality of vehicles based at least in part on the similarity score for each vehicle of the first plurality of vehicles comprises selecting the second plurality of n vehicles from the first plurality of vehicles based on vehicles from the first plurality of vehicles having one of n lowest similarity scores to the first vehicle.

* * * * *